(12) United States Patent
Briley

(10) Patent No.: US 6,456,610 B1
(45) Date of Patent: Sep. 24, 2002

(54) TDM/TDMA WIRELESS TELECOMMUNICATION SYSTEM WITH ELECTRONIC SCANNING ANTENNA

(75) Inventor: Bruce Edwin Briley, Countryside, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/553,202

(22) Filed: Nov. 7, 1995

(51) Int. Cl.$^7$ ................................................. H04B 7/26

(52) U.S. Cl. .......................... 370/337; 370/337; 455/25

(58) Field of Search .............................. 370/321, 337, 370/345, 347, 280, 478, 310, 339, 329, 336; 455/33.1, 53.1, 54.1, 277.1, 25; 375/373, 376; 379/59; 342/368

(56) References Cited

U.S. PATENT DOCUMENTS

| | | | |
|---|---|---|---|
| 4,413,263 A | | 11/1983 | Amatay et al. ............. 343/756 |
| 4,458,247 A | | 7/1984 | Amitay ....................... 343/368 |
| 4,460,897 A | | 7/1984 | Gans ........................... 343/754 |
| 5,175,729 A | * | 12/1992 | Borras et al. ................ 370/345 |
| 5,193,091 A | | 3/1993 | Crisler et al. ............... 370/95.1 |
| 5,226,071 A | | 7/1993 | Bolliger et al. ............... 379/60 |
| 5,231,635 A | | 7/1993 | Travers et al. .............. 370/95.1 |
| 5,239,667 A | | 8/1993 | Kanai ........................... 455/10 |
| 5,303,240 A | * | 4/1994 | Borras et al. ................ 370/347 |
| 5,329,522 A | * | 7/1994 | Takagi ......................... 370/280 |
| 5,448,753 A | * | 9/1995 | Ahl et al. ..................... 455/33.1 |
| 5,475,681 A | * | 12/1995 | White et al. ................. 370/347 |
| 5,548,294 A | * | 8/1996 | Sturza ......................... 342/372 |

OTHER PUBLICATIONS

A Fast Low–Loss Microstrip p–i–n Phase Shifter, by B. Glance, IEEE, vol. 27 No. 1, Jan. 1979, pp. 14–16.
"A Satellite System With Limited–Scan Spot Beams", by A.S. Acampora; C. Dragone, and D.O. Reudink, IEEE, vol. 27 No. 10, Oct. 1979, pp. 1406–1415.
"A Scanning Spot–Beam Satellite System" by D.O. Reudink and Y.S. Yeh, The Bell System Technical Journal, vol. 56 No. 8, Oct. 1977. pp. 1549–1560.
"A Wide Scan Quasi–Optical Frequency Diplexer" by J.J. Fratamico and M.J. Gans and G.J. Owens, IEEE, vol. 30 No. 1, Jan. 1982, p. 20–27.
"Burst Modem Synchronization at Low CNR Levels", by A.S. Acampora, L.J. Greenstein, G. Vannucci and Y.S. Yeh, IEEE, 1980, p. 38.2.1–28.2.6.
"Switching Performance of a 12 GHZ p–i–n Phase Shifter/ Driver Module for Satellite Communication Phased Array", by N. Amitay and B. Glance, IEEE, vol. 29 No. 1, Jan. 1981, p. 46–50.

(List continued on next page.)

Primary Examiner—Hassan Kizou
(74) Attorney, Agent, or Firm—J. P. DeMont; Eugene J. Rosenthal

(57) ABSTRACT

A terrestrial wireless telecommunication system is disclosed that uses an electronic scanning antenna to rotate a beam that carries communication messages between a base station and a plurality of wireless terminals. A base station transmitter transmits the communication messages to each wireless terminal, via the electronic scanning antenna, in a time-division multiplexed ("TDM") data stream that is synchronized with the rotation of the beam, and a base station receiver receives the communication messages from each wireless terminal in a time-division multiple access ("TDMA") data stream that is also synchronized with the rotation of the beam.

10 Claims, 16 Drawing Sheets

OTHER PUBLICATIONS

"Frame Synchronizer Concept for TDMA Burst Modems", by A.S. Acampora and J.T. Curry, IEEE, vol. 16, No. 2, Mar. 1980, p. 169–179.

"Rain Attenuation at 10–30 GHZ Along Earch–Space Paths: Elevation Angle, Frequency, Seasonal, and Diurnal Effects", by H.W. Arnold, D.C. Cox, and A.J. Rustako, IEEE vol. 29 No. 5, May 1981, p. 716–721.

"Satellite Phased Arrays: Use of Imaging Reflectors with Spatial Filtering in the Focal Plane to Reduce Grating Lobes", by C. Dragone and M.J. Gans, The Bell System Technical Journal, vol. 59 No. 3. Mar. 1980, p. 449–461.

"Scanning–Spot–Beam Satellite for Domestic Service", by Y.S. Yeh, J. Spacecraft, vol. 18 No. 3, May–Jun. 1981, p. 274–278.

"Sequencer Designs for Scanning–Beam Satellites" by W.L. Aranguren; R.E. Langseth; and C.B. Woodworth, The Bell System Technical Journal, vol. 58 No. 9, Nov. 1979, p. 1999–2011.

"Six International Conference on Digital Satellite Communications" Sep. 19–23, 1983, A.J. Rustako; G. Vannucci, C.B. Woodworth, p. XI–18–XI–23.

* cited by examiner

TDM/TDMA WIRELESS TELECOMMUNICATION SYSTEM WITH ELECTRONIC SCANNING ANTENNA

FIELD OF THE INVENTION

The present invention relates to wireless telecommunications in general and, in particular, to a terrestrial telecommunications system that employs an electronic scanning antenna that rotates a narrow antenna beam in synchronism with time-division multiplexed ("TDM") and time-division multiple access ("TDMA") data streams.

BACKGROUND OF THE INVENTION

It can be prohibitively expensive to provide wireline telecommunications service in sparsely-populated regions. Therefore, it would be advantageous if a low-cost telecommunication system could be devised that would enable service to be provided to those areas at an affordable cost. Moreover, in regions where customers legally have a choice of service providers, such a system could facilitate the entry of additional service providers.

Cellular telecommunications equipment is often considered for such "local-loop" applications, but in some circumstances it may not be suitable because of range limitations. A conventional cellular system typically employs a plurality of geographically dispersed base stations, each of which services a distinct geographic area called a "cell." Each base station in a cellular system typically employs either: (1) an omnidirectional antenna, which transmits into and receives from the entire cell, or (2) several directional antennas, which each transmit into and receive from a different azimuthal sector of the cell.

The result is that the range at which a base station can service a wireless terminal is typically limited to 10 miles. This range can be increased by increasing the power at which the signals are transmitted, but this can be prohibitively expensive and the increased ambient radiation can jeopardize the public's safety.

Another disadvantage of a conventional cellular system is that it cannot be used in an area that has a substantially allocated frequency spectra. It would therefore be desirable if a wireless telecommunications system could be devised that would radiate so little power that it would only minimally interfere with other signals at the same frequencies.

SUMMARY OF THE INVENTION

A typical embodiment of the present invention uses an electronic scanning antenna to rotate a beam that carries communication messages between a base station and a plurality of wireless terminals. A base station transmitter transmits the communication messages to each wireless terminal, via the electronic scanning antenna, in a time-division multiplexed ("TDM") data stream that is synchronized with the rotation of the beam, and a base station receiver receives the communication messages from each wireless terminal in a time-division multiple access ("TDMA") data stream that is also synchronized with the rotation of the beam.

In accordance with this embodiment, RF power is transmitted to a given wireless terminal for only a small fraction of the time, which thereby decreases the average power density incident upon each of the wireless terminals. Therefore, a higher peak transmitter power can be used at the base station to provide substantially improved range as compared to prior art systems.

Typical embodiments of the invention are also advantageous because they can be employed in geographic regions that have a substantially allocated frequency spectra, because the low average RF power radiated by the embodiments reduces the likelihood of interference with other signals.

DETAILED DESCRIPTION

Figure 1:
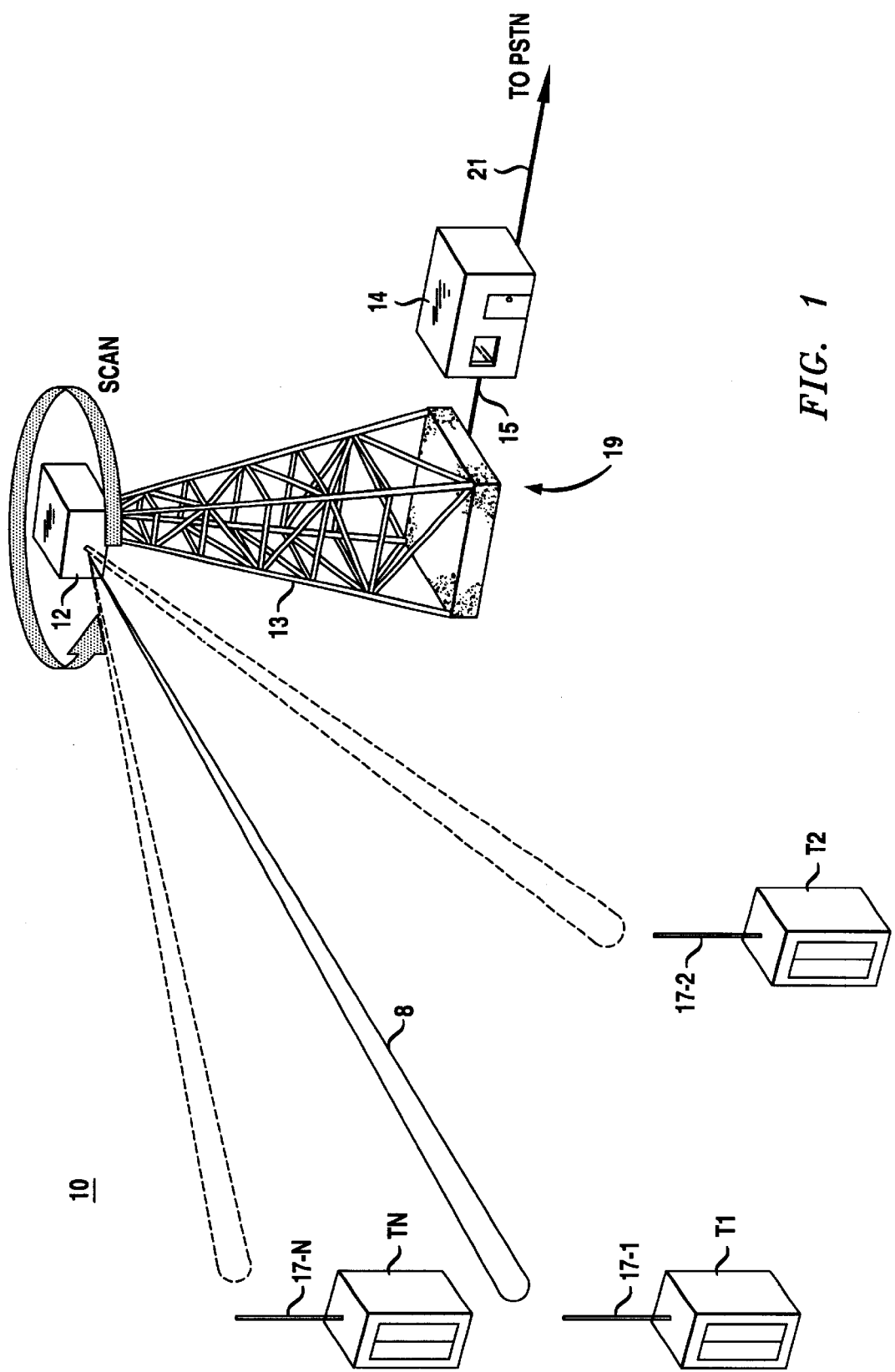
FIG. 1 is a schematic perspective drawing of an embodiment of the present invention.

FIG. 1 shows a schematic perspective drawing of a wireless telecommunications system, generally designated as 10, in which a base station, generally designated as 19, is capable of transmitting and receiving, via radio, communication messages with wireless terminals $T_1$ to $T_N$. Base station 19 advantageously comprises hut 14, tower 13, antenna 12 and signal cabling 15. Hut 14 advantageously comprises the equipment that interfaces the wireless terminals with the public switched telephone system (not shown) via communication link 21, which can be either wireline or wireless.

At base station 19, electronic scanning antenna 12, situated atop tower 13, rotates a narrow beam, generally designated as B, 360° in azimuth to carry communication messages between the base station and the wireless terminals.

Advantageously, a transmitter in base station 19 transmits the communication messages to the wireless terminals in a time-division multiplexed data stream that is synchronized with the rate of rotation of beam B. Thus, electronic scanning antenna 12 transmits the communication messages intended for wireless terminal $T_i$ only when wireless terminal $T_i$ is within beam B. Reciprocally, wireless terminals $T_1$ to $T_N$ transmit communication messages to base station 19 in a time-division multiple access data stream that is also synchronized with the rate of rotation of beam B. Thus, wireless terminal $T_i$ transmits communication messages only when wireless terminal $T_i$ is within beam B. When wireless terminal $T_i$ is not within beam B, it preferably neither transmits nor receives.

Figure 2:
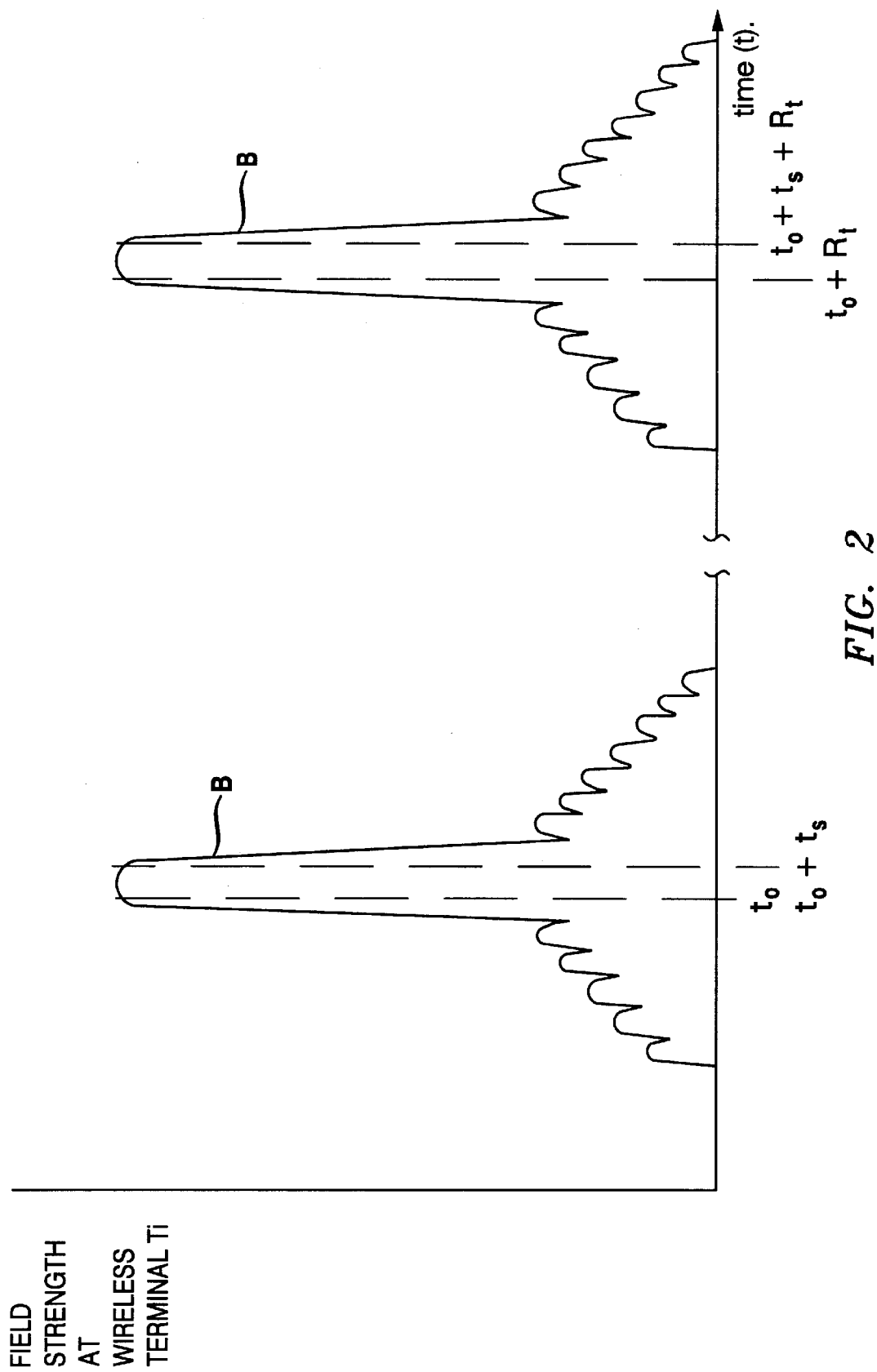
FIG. 2 is a plot of field strength vs. time at a wireless terminal used in conjunction with an embodiment of the present invention.

As shown in FIG. 2, the field strength, which is indicative of radiated RF power, at wireless terminal $T_i$ is shown as a function of time. A portion of the main lobe of beam B rotates through terminal $T_i$ during a first time interval between $t=t_0$ to $t=t_0+t_s$. During this first time interval, a portion of a communication message is transmitted to terminal $T_i$ by beam B. During subsequent time intervals (i.e., between $t=(t_0+R_t)$ and $t=(t_0+t_s+R_t)$, where $R_t$ is the period of rotation of beam B), a successive portion of the communication message is transmitted to terminal $T_i$. According to this technique, the average incident transmitted power is kept low in comparison to conventional systems.

When wireless telecommunications system 10 is intended to service a large number of users, a plurality of wireless terminals can be disposed at the same azimuthal angle (i.e., compass heading) and at various distances from the base station. In this case, those wireless terminals at the same compass heading could be serviced by separate frequency-delimited channels within the time-division multiplexed and time-division multiple access data streams. In other words, at the instant of time that beam B points to multiple wireless terminals, base station 19 advantageously communicates with those wireless terminals with frequency-division multiplexed techniques and, reciprocally, those wireless terminals communicate with base station 19 with frequency-division multiple access techniques. In an alternative embodiment, spread spectrum techniques (e.g., direct-sequence, frequency-hopping or time-slot hopping) can be employed in addition to, or instead of, the frequency-division multiplexed and frequency-division multiple access.

According to the illustrative embodiment, it should be apparent that the average RF power incident upon any one wireless terminal is only a fraction of what it would otherwise be if an omnidirectional antenna beam were utilized. Consequently, telecommunications system 10 exhibits improved range in comparison with a broad beam system, for a given radiated power density. Alternatively, in embodiments where only a limited range is required, base station 19 can be designed to radiate less power than a conventional system.

Furthermore, some embodiments of the present invention can be used in geographic regions that have a substantially allocated frequency spectra, because the low average RF power radiated by the embodiment reduces the interference with other signals. This is advantageous because it facilitates the design of a system that can operate over a universal frequency.

Figure 3:
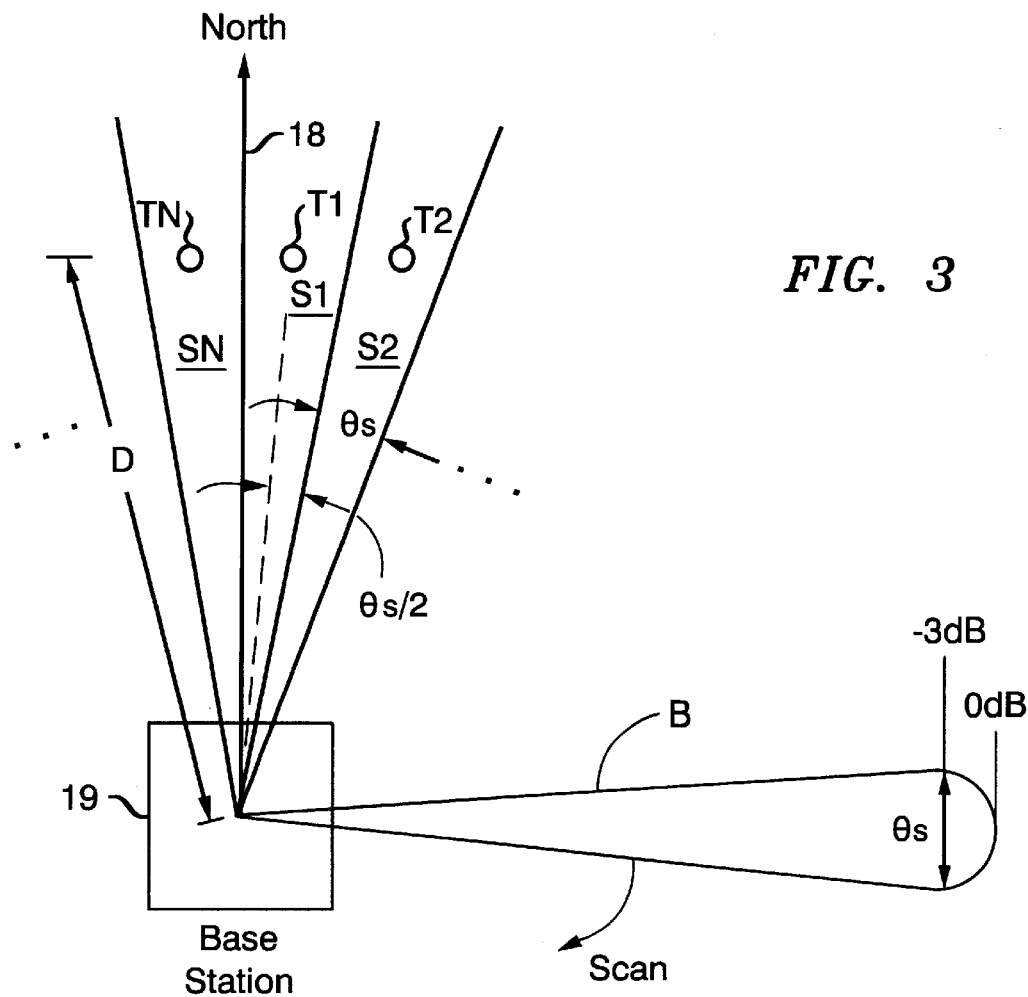
FIG. 3 depicts an aerial view of the progression of the beam that is associated with an embodiment of the present invention.

FIG. 3 illustrates an aerial view of the rotation of beam B according to an embodiment of the present invention. The geographic area serviced by base station 19 is conceptually divided into N azimuthal sectors, $S_1$ to $S_N$, each comprising an angle of $Q_s$ degrees. Centrally located within each angular sector, at a distance D from base station 19, is wireless terminal $T_i$. Electronic scanning antenna advantageously rotates Beam B continuously, in contrast to in discrete steps. As beam B sweeps from one side of a given azimuthal sector to the other, modulated RF signals are transceived between base station 19 and the wireless terminal or terminals in that sector.

Advantageously, beam B is designed with a 3 dB azimuthal beamwidth substantially equal to $Q_s$. Then, in the time interval during which the peak of the beam sweeps through the given azimuthal sector, the −3 dB beamwidth portion of the main lobe will sweep through the wireless terminal at the center of the sector. The signals transmitted from a wireless terminal towards base station 19 must be transmitted prior to the time interval that antenna beam B scans through its associated azimuthal sector, due to the finite speed of propagating electromagnetic energy.

The distance D affects the time interval during which the wireless terminal must transmit in order for the signals to arrive at base station 19 within the correct time-division multiplexed time slot. In the relatively simple system of FIG. 3, all wireless terminals $T_1$ to $T_N$ are at distance D from base station 19 and, thus, the lead time for each wireless terminal's data transmissions are the same. In other embodiments, the wireless terminals can be disposed at varying distances from base station 19 so long as the appropriate compensating delays are used.

An exemplary rotational speed for beam B is 64,000 rotations per second, which can conveniently be used when beam B has a 3 dB beamwidth $Q_s$ of one degree, and with azimuthal sectors $S_1$ to $S_N$ each one degree wide. Furthermore, these parameters can be advantageously used in conjunction with speech that is sampled at 8,000 samples per second, 8 bits per sample, thereby enabling one bit of uncompressed audio to be transmitted and received per rotation. Thus, for the relatively simple case of one wireless terminal per azimuthal sector, N equals 360, and the time interval during which the beam travels through each wireless terminal from one −3 dB point to the other, corresponds to 43.4 nanoseconds. For a carrier operating at 1 GHz, this corresponds to 43.4 RF cycles, which is sufficient to convey the information of one data bit. Hence, according to this embodiment, a data stream consisting of 360 time multiplexed time slots $t_s$ could be transmitted, with each time slot corresponding to a particular one of angular sectors $S_1$ to $S_N$.

Figure 4:
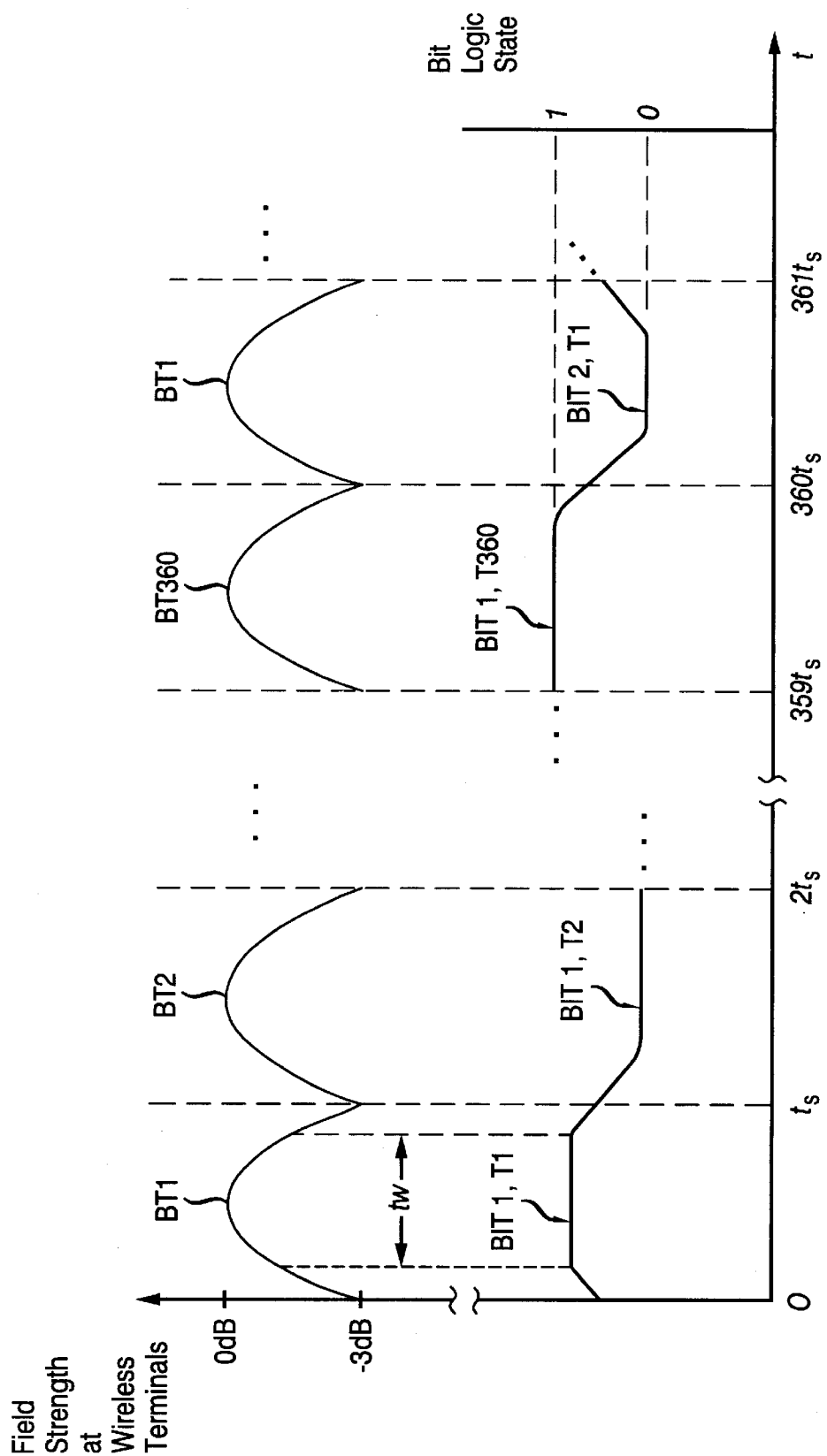
FIG. 4 depicts the timing relationship between a beam and a time-division multiplexed data stream in accordance with the present invention.

The data transmission scheme described above is illustrated in the timing diagram of FIG. 4. During the interval from $t=0$ to $t_s$, data bit BIT $1,T_1$, which is intended for wireless terminal $T_1$, is transmitted from base station 19; during $t=t_s$ to $2t_s$, data bit BIT $1,T_2$, which is intended for wireless terminal $T_2$, is transmitted, and so on. The field strength incident upon wireless terminal $T_1$ at $t=0-t_s$ (delayed by the propagation delay) is depicted by the graph $BT_1$; the field strength incident upon wireless terminal $T_2$ during $t_s-2t_s$ is represented by graph $BT_2$, and so forth. At the end of 360 time slots, beam B again sweeps through sector $S_1$, and the next bit, BIT $2,T_1$, in the data stream transmission to terminal $T_1$ is transmitted.

Advantageously, a binary system is employed, however, other systems could be used. Suitable modulation formats for the data bits include, but are not limited to quaternary phase shift keying (QPSK), M-ary Quadrature Amplitude Modulation (QAM) and M-ary Minimum Shift Keying (MSK), all of which are known in the art. Whatever modulation technique is used, a finite transition time must be provided between successive data bits to minimize intersymbol interference. In practice, intersymbol interference can be reduced by limiting the time during which each data bit is transmitted and received.

Optionally, more than one bit can be transceived during each time slot, which would allow the rate of rotation to be reduced. Analogously, compression techniques could be used to reduce the bit rate, which would also allow the rate of rotation to be reduced.

Advantageously, each wireless terminal $T_i$ begins transmission of a given data bit at a lead time $t_L$ prior to the time that beam B arrives at its associated sector, where $t_L$ is defined by:

$$t_L = c/D_i \qquad \text{(Eq. 1)}$$

where c is the speed of light and $D_i$ is the distance from wireless terminal $T_i$ to base station 19. For instance, wireless terminal $T_1$ can begin transmitting a first data bit at the time $360t_s - t_L$ so that it arrives at base station 19 during the time slot from $360t_s$ to $361t_s$. For the purpose of reducing the signal to noise (S/N) ratio, each data pulse transmitted by a given wireless terminal advantageously has a pulsewidth slightly less than $t_s$. In addition, each wireless terminal receiver can be designed to shut down when base station 19 beam is not pointing at that terminal. With 360 sectors, each wireless terminal transmitter is transmitting less than 0.28% of the time and, therefore, the RF power levels at the wireless terminal are kept low. Analogously, reception also occurs only during a small fraction of the time, thereby improving the S/N ratio. Concurrently, interference with the communications of other wireless terminals is reduced.

In an alternative embodiment, alternate sweeps of beam B can be used for transmission and reception. For example, the first 360 time slots of FIG. 4 could be used for time-division multiplexed data transmission from base station 19 to the wireless terminals, while the next 360 time slots could be used for time-division multiplexed data transmission from the wireless terminals to base station 19.

It should be noted that, depending on the application, beam B is advantageously either a pencil beam or a fan-shaped beam having azimuthal and elevational beamwidths with the elevational beamwidth being broader than the azimuthal beamwidth. A pencil beam maximizes antenna gain and in flat topographical areas can provide service to many ground-based users. In uneven terrain, a fan beam or an upwardly tilted pencil beam is advantageous. In either case, it can be desirable to tilt the fan or pencil beam upwards so that multipath reflections off of the terrain are reduced.

Each wireless terminal can use a relatively simple antenna 17-1 to 17-N, such as a monopole or a dipole with a broad beamwidth in azimuth. Generally, the high-gain of electronic scanning antenna 12 enables the wireless terminals to operate with small, inexpensive antennas.

Figure 5:
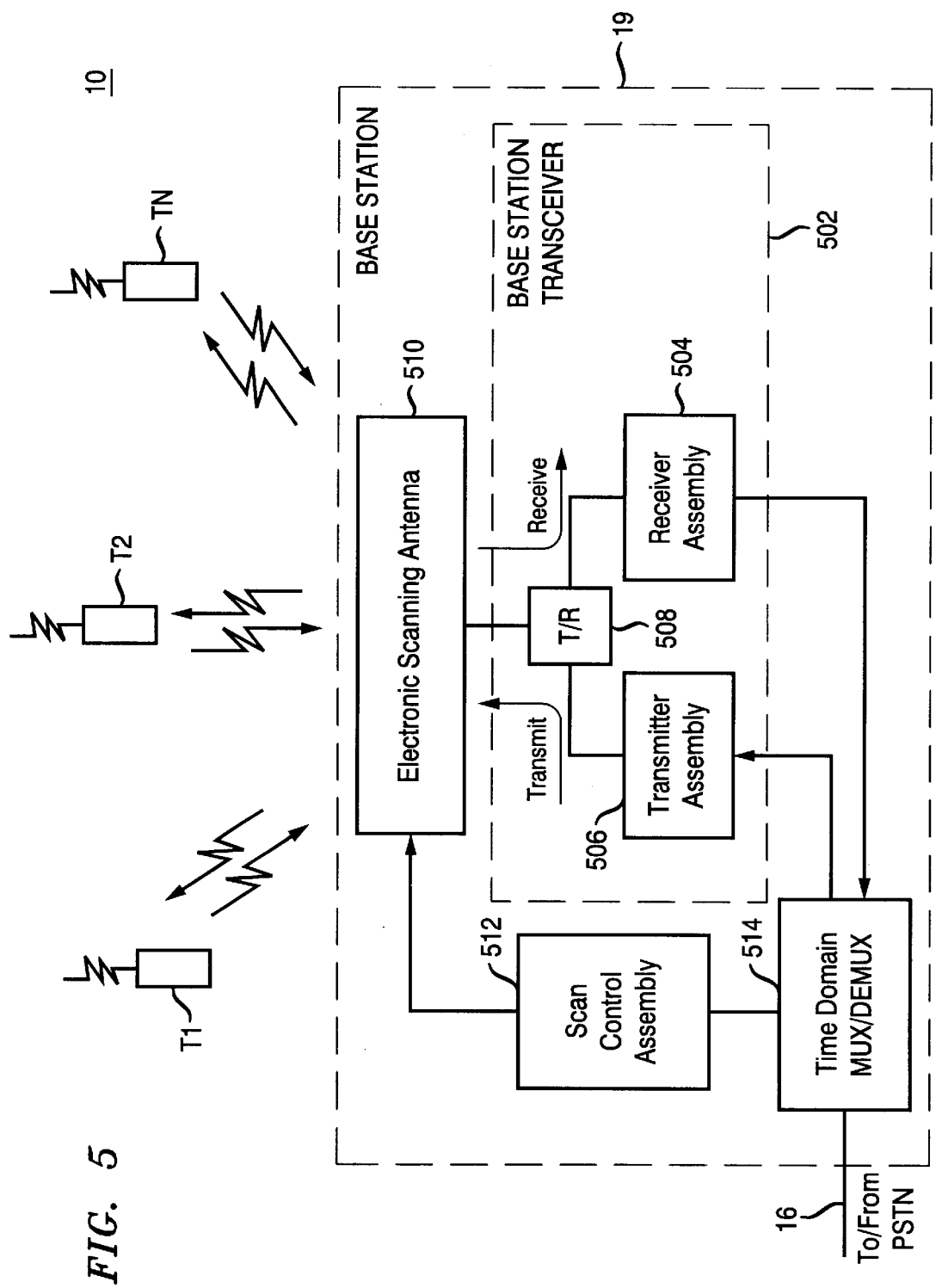
FIG. 5 is a schematic block diagram of an embodiment of the present invention.

FIG. 5 shows a schematic block diagram of wireless telecommunications system 10. Base station 19 advantageously comprises: electronic scanning antenna 510, scan control assembly 512, time domain mux/demux 514 and base station transceiver 502. The details of electronic scanning antenna 510 will be discussed below.

Scan control assembly 512 controls where electronic scanning antenna 510 points beam B and synchronizes the transmission and reception of messages between the wireless terminals with the rotation of beam B.

Time domain mux/demux 514 converts incoming communication messages from the public switched telephone network on communication link 21 to a time-division multiplexed data stream for transmission to wireless terminals $T_1$ to $T_N$, and provides the data stream to transmitter assembly 506.

Base station transceiver 502 is coupled to antenna 510 and advantageously comprises: transmit/receive (T/R) block 508, transmitter assembly 506 and receiver assembly 504. Transmit/receive block 508, which advantageously comprises a network of duplexers, enables the transmission and reception of communication messages through a single antenna. Receiver assembly 504 down-converts, filters and demodulates messages received from wireless terminals $T_1$ to $T_N$. The demodulated messages are supplied to time domain mux/demux 514, which converts the data stream into a format suitable for transmission to the public switched telephone network. Transmitter assembly 506 modulates and amplifies the data stream from time domain multiplexer 506 before transmission by electronic scanning antenna 510.

Figure 6:
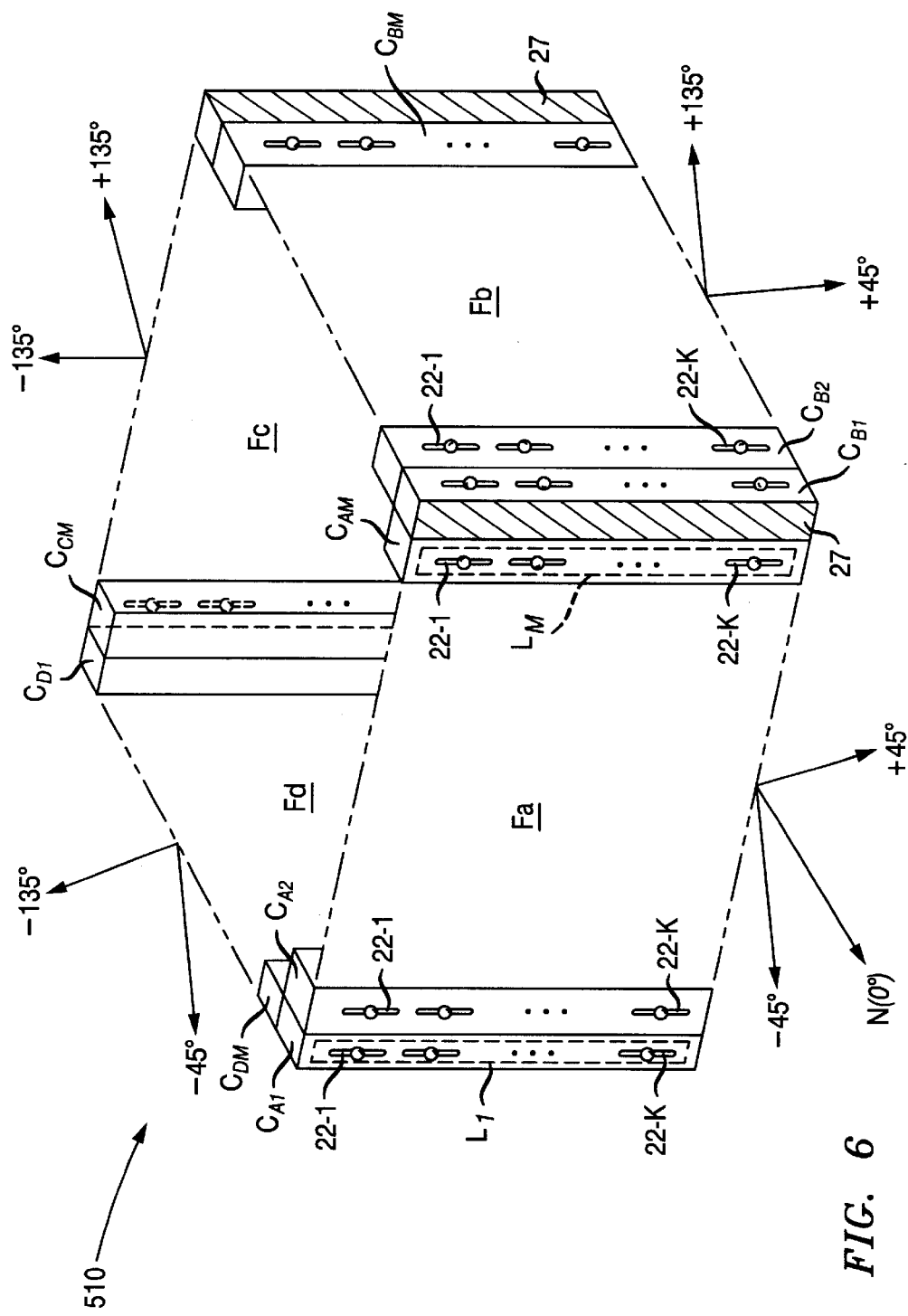
FIG. 6 is a three-dimensional drawing of an electronic scanning antenna that can be used with the embodiment of FIG. 5.

FIG. 6 depicts a schematic perspective drawing of electronic scanning antenna 510. Advantageously, antenna 510 is a phased array antenna with four planar aperture faces $F_a$ to $F_d$ arranged to form a cube. Each aperture face includes M line arrays $L_1$ to $L_M$ arranged in columns to form a planar aperture for each face. Each line array $L_i$ consists of K broad beam antenna elements 22-1 to 22-K. Each line array of a face is formed within one of M column assemblies for that face (e.g., column assemblies $C_{A1}$ to $C_{AM}$). Antenna elements 22-1 to 22-K can be, for example, short printed dipoles fabricated from microstrip transmission lines, and appropriately sealed in a dielectric material.

Antenna elements 22-1 to 22-K of a given column assembly are driven in phase, while the columns themselves are driven with a time-varying, progressive phase with respect to one another. This time-varying, progressive phase produces a beam that scans in a plane perpendicular to the columns. For example, when the normal axis of face $F_a$ is pointing north (i.e., to 0°), face $F_0$ scans azimuthal sectors from 45° to +45°; face $F_b$ scans from +45° to +135°, and so forth, so that the entire assembly provides 360° azimuthal coverage.

The surface area of each face, the frequency used, and the amplitude taper employed between and within the columns will be determinative of the beamwidths realized in the azimuth and elevation planes. For instance, if a broad fan beam is desired, it can be desirable to use only one antenna element 22-i per column. Another possibility is to utilize long, narrow horn antennas as the columns themselves, which would produce higher gain in the elevation plane than a short dipole would produce. Regardless, phased array antennas are well-known, and it is understood that other suitable geometric arrangements can alternatively be used for electronic scanning antenna 510 to achieve the objective of high speed scanning of a narrow beam. For instance, a circular or cylindrical array of elements can be fed in a Wullenweber-like fashion, with a subset of the elements being fed rotationally with appropriately delayed elements of the RF signal. Moreover, while the use of a phased array is preferred because of the high scanning rate obtainable, it is understood that an electronically switched array could alternatively be employed if a lower scanning rate is feasible. Electronically switched arrays generally scan at lower scan rates than phased arrays and can, for example, be configured as a circular or cylindrical array with given angular sectors being successively switched on and off to rotationally scan the beam in azimuth.

With continuing reference to FIG. 6, each column assembly can be constructed as a solid rectangle or a solid pie shape, to house transmission lines and electronics associated with the antenna elements of that column. To provide sufficient space for the outer columns, each face is designed with an unused aperture region 27. Other electronics associated with the columns can be housed behind the columns within the center of the cubic structure, space permitting.

Figure 7:
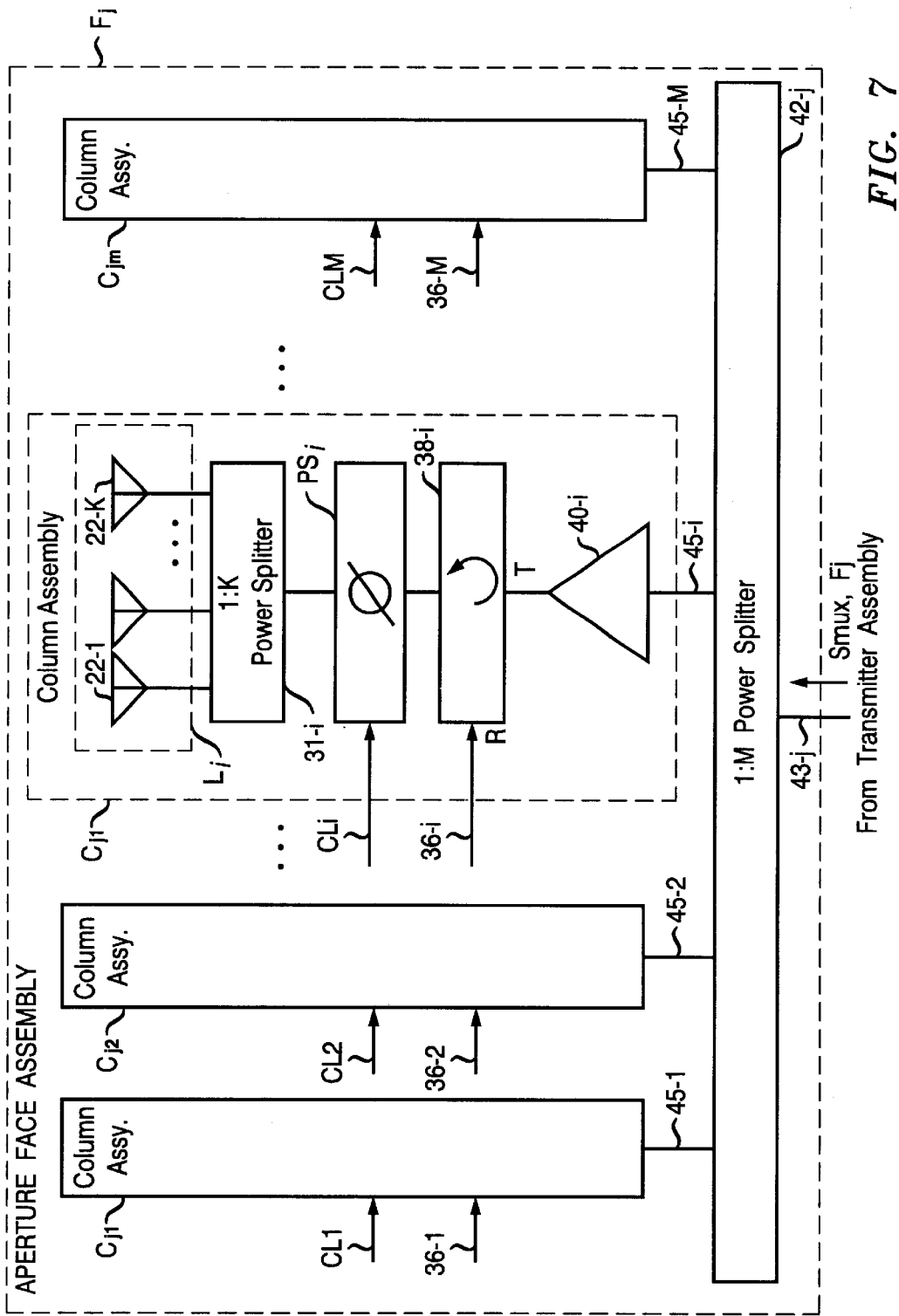
FIG. 7 is a block diagram of an aperture face assembly usable with the antenna of FIG. 6.

FIG. 7 depicts a schematic block diagram of an exemplary aperture face assembly $F_j$. At the input, a modulated, time-domain multiplexed RF input signal $S_{MUX,Fj}$ is applied to input port 43-$j$ of 1:M power splitter 42-$j$ where it is split among M output ports 45-1 to 45-M. Power splitter 42-$j$ can be an equal power splitter to achieve high-gain in azimuth but with correspondingly high sidelobes. Optionally, power splitter 42-$j$ can have an amplitude taper to realize lower sidelobes in azimuth at the expense of reduced gain. The signal on each output port 45-1 to 45-M is applied to the input of an associated column assembly $C_{j1}$ to $C_{jM}$.

An exemplary configuration for each of column assemblies $C_{A1}$ to $C_{AM}$, ..., $C_{D1}$ to $C_{DM}$ is the schematic block diagram within column assembly $C_{ji}$. For the purposes of this specification, the term "column $C_{ji}$" is used to represent an exemplary component which can be used for any similarly labeled component. Thus, for example, column $C_{ji}$ is indicative of an exemplary configuration for any of the columns $C_{A1}$–$C_{AM}$, ..., $C_{D1}$–$C_{DM}$. Similarly, the term "amplifier 40-$i$" is used to indicate a typical component that is also within the other column assemblies. Thus, for example, since column $C_{ji}$ has an amplifier 40-$i$, then column $C_{A1}$ and $C_{AM}$ have amplifiers 40-1 and 40-M, respectively, and so forth. Amplifier 40-$i$ amplifies the portion of signal $S_{MUX,Fj}$ on port 45-$i$. The amplifiers such as 40-$i$ within each column assembly are only necessary if the signal power to each column assembly as amplified by previous amplifier stages is insufficient to produce the desired radiated power. Conversely, if the radiated power is insufficient even with the use of the amplifiers such as 40-$i$, an additional amplifier (not shown) behind each radiating element 22-1 to 22-K could be utilized in an adaptive array configuration.

Signal $S_{MUX,Fj}$ contains modulated data bits that are intended for the wireless terminals within the 90° angular sector covered by the associated aperture face. In a simple system, signal $S_{MUX,Fj}$ can be a single carrier frequency time-division multiplexed signal, such as in the system described in relation to FIG. 3 where each azimuthal sector contains only a single wireless terminal. In large user systems, multiple, closely spaced frequency channels can be utilized in which signal $S_{MUX,Fj}$ would be frequency-division multiplexed and time-division multiplexed. In either case, the amplifiers such as 40-$i$ are advantageously highly linear to prevent excessive intermodulation distortion (IMD) generation and associated interference between channels. Consequently, the amplifiers as 40-$i$ can include an IMD cancellation loop which can be either a feed forward loop or a predistortion cancellation loop.

The amplified output signal of amplifier 40-$i$ is applied to transmit port T of a duplexer as 38-$i$, which routes the signal towards a corresponding one of M variable phase shifters $PS_1$ to $PS_M$, such as phase shifter $PS_i$. (The duplexers as 38-$i$ within each column assembly together comprise the T/R block 508 in this embodiment). The output of each phase shifter is applied to an input port of a 1:K power splitter as 31-$i$ that feeds a given line array such as $L_i$. Power splitters as 31-$i$ can be equal power splitters to provide uniform illumination of antenna elements 22-1 to 22-K in the elevation plane. Alternatively, an amplitude taper in elevation can be used for low sidelobe performance in elevation.

The insertion phase of each phase shifter $PS_1$ to $PS_M$ is determined by a control signal on an associated control line $CL_1$ to $CL_M$. As the control signal is varied from one extreme to the other on each phase shifter, the antenna beam produced by the associated aperture face is scanned from one angular extreme to the other, which in the current example corresponds to a scanning sector of 90°. To achieve an overall scanning speed on the order of 64,000 rotations per second, the control signals on lines $CL_1$ to $CL_M$ must be a correspondingly rapid changing signal and the phase shifters must have an extremely fast response. A sufficiently rapid scanning speed can be realized by using linearly saturable magnetic delay elements for the phase shifters, which respond to impressed control current levels on the control lines. Suitable magnetic delay elements for this purpose are known in the art and are commercially available from various manufacturers. Preferably, these delay elements are bilateral so that signals traversing them from either direction (transmit and receive) would undergo the same insertion phase delay.

Advantageously, phase shifters PS, to PSM are also frequency independent over the frequency band of interest so as to provide a phase shift which does not change as a function of the frequency of the RF signal being conveyed. This allows the same configuration to produce an identically positioned lobe for a range of frequencies. Consequently, multi-carrier modulation schemes such as frequency-shift keying could be readily used for a given frequency channel. Frequency independent phase shifters also enables multiple, closely spaced frequency-division multiplexed channels to be utilized for large user configurations.

One advantage of using saturable magnetic delay elements for phase shifters $PS_1$ to $PS_M$ is that they are capable of causing the antenna beam to scan continuously over a given angular sector in an analog manner. Such continuous scanning is realized by using continuously changing control signals on control lines $CL_1$ to $CL_M$. With a continuous scan system, an infinite number of beam pointing locations are obtainable over the scanning sector. Conversely, in a discrete scanning system employing discretely changing phase shifters such as P-I-N diode phase shifters, the number of beam pointing locations are limited, and sidelobes tend to be higher. (This is also the case for the electronic switching type of scan system). Moreover, with discrete systems there is a finite switching time between beam pointing locations, which reduces the number of RF cycles associated with each data bit.

For instance, if 43.4 ns long time slots were used to communicate one data bit as in the example above, and a discrete scan system were used with a switching time of about 10 ns between beam positions, information transfer capability would suffer. Discrete scanning systems have been used in the past in synchronism with time-division multiplexed data streams in spot beam satellite systems. See, for example, an article entitled "An Experimental Scanning Spot Beam Satellite System Implementing 600 Mbit/sec time-division multiple access", by A. Rustako et al., Sixth International Conference on Digital Satellite Communications, Sep. 19–23, 1983.

With continuing reference to FIG. 7, on the receiving side, the signals originating from the wireless terminals are received by the line arrays as $L_i$ and routed through the 1:K power splitters as 31-$i$. The received signals are then delayed by phase shifters $PS_1$ to $PS_M$ and appear on duplexer receive ports R which connect to respective transmission lines 36-1 to 36-M. Precautions must be taken to distinguish the received signals at ports R from the reflected power of the transmitting signal caused by the VSWR of the components following each duplexer as 38-$i$. One approach is to use different frequencies for base station and wireless terminal transmissions. Another technique entails using different coding schemes for base station 19 and the wireless terminal transmissions, in conjunction with a matched filter in base station 19 receiver to distinguish between reflected power and received power. Another approach is to use the same frequencies and/or coding technique for transmit and receive, but with alternating rotations for transmit and receive modes, as discussed earlier.

Figure 8:
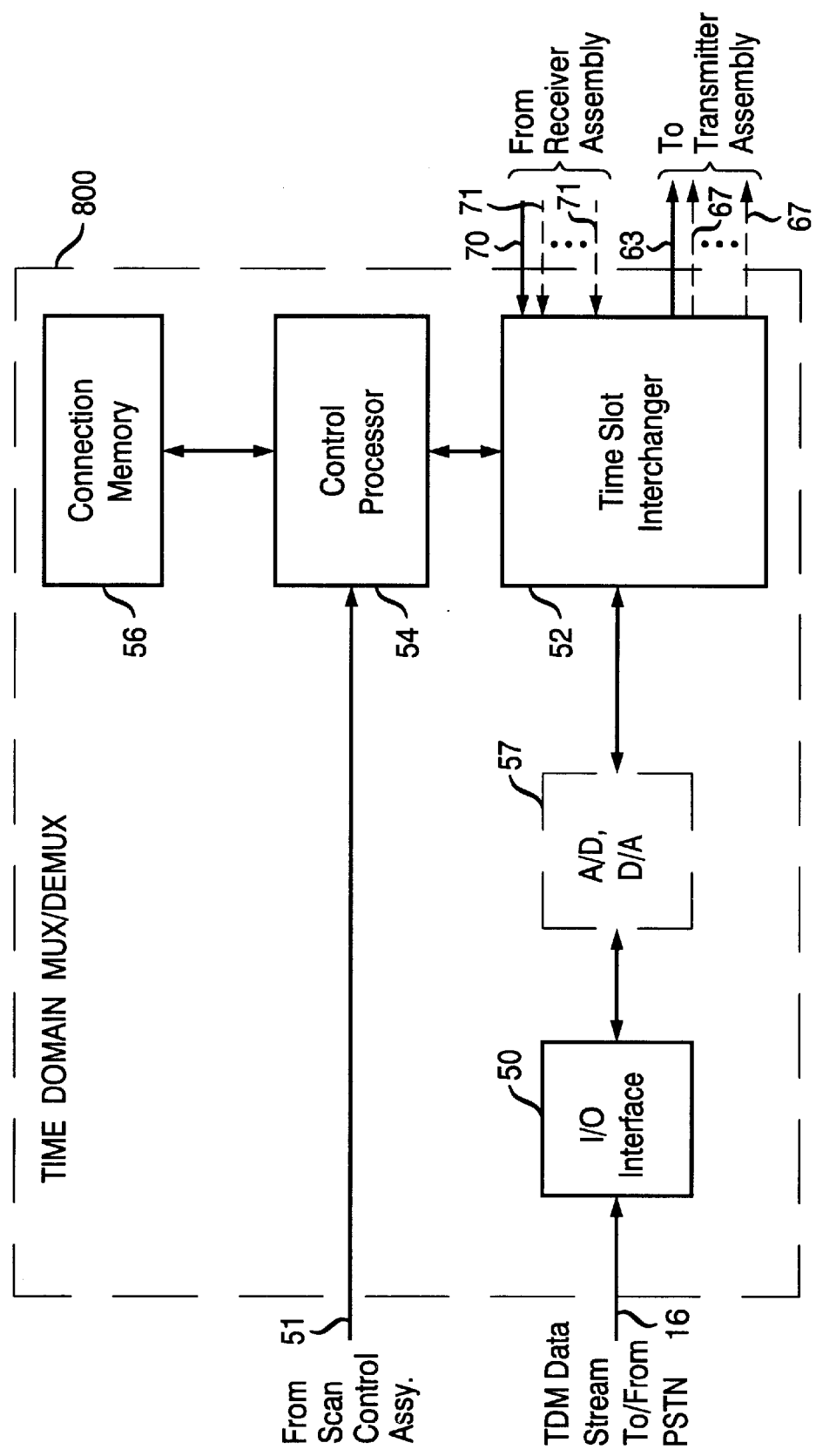
FIG. 8 depicts an exemplary time domain multiplexer/demultiplexer, which can be used with the wireless system of FIG. 5.

Turning now to FIG. 8, a schematic block diagram of an illustrative time domain MUX/DEMUX 800 is depicted, which can be used as the configuration for MUX/DEMUX 514 of FIG. 5. MUX/DEMUX 800 can be utilized when the communication messages from the public switched telephone network arrive on communication link 16 in a time-division multiplexed format. (If the messages arrive from the public switched telephone network unmultiplexed on many separate lines, such as in a fiber optic trunk, then MUX/DEMUX 514 would need to be configured differently to perform pure multiplexing and demultiplexing functions).

Input/output (I/O) interface 50 functions to interface communication link 16 with MUX/DEMUX 800. I/O interface 50 is typically a modem if link 16 is wireline. If link 16 is a wireless link, I/O interface 50 would comprise the equipment necessary to effect the wireless communication to the public switched telephone network, including, for example, a modem, an antenna, and so forth.

The communications channels from the public switched telephone network can arrive at base station 19 on link 16 in a digital time-division multiplexed data stream. An incoming public switched telephone network digital time-division multiplexed data stream is applied to Time Slot Interchanger (TSI) 52. If the public switched telephone network is in an analog format, then analog to digital, digital to analog (A/D, D/A) converter 57 would be used to convert the analog time-division multiplexed stream to a digital one, and vice versa for transmission of messages back to the public switched telephone network.

Figure 9:
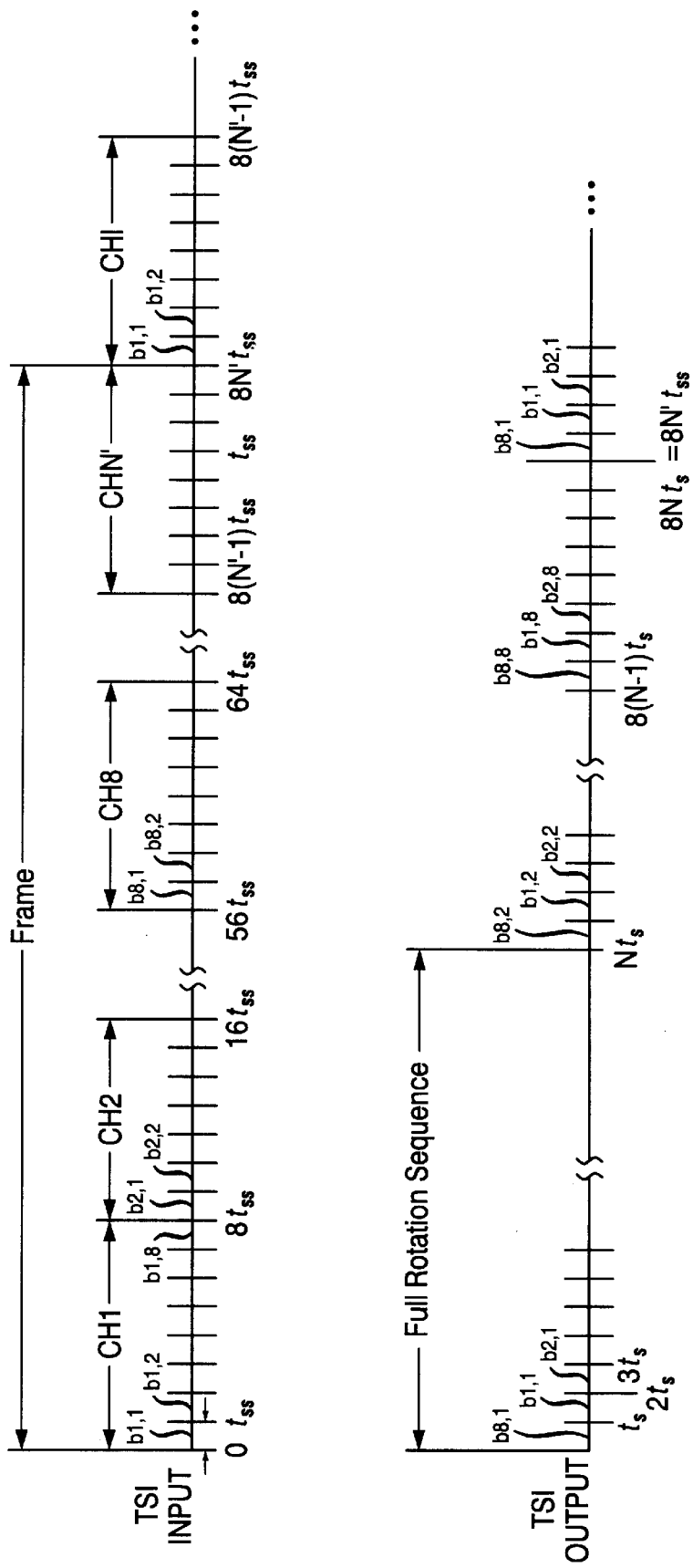
FIG. 9 shows timing diagrams of time-division multiplexed data streams containing communication messages.

Time Slot Interchangers are well-known devices that convert an incoming time-division multiplexed data stream that has channelized data in predefined time slots, to a reordered output time-division multiplexed data stream with reordered bytes or bits. TSI 52 operates in conjunction with control processor 54 and connection memory 56. In a typical public switched telephone network multiplexed transmission of audio data, the data is sampled at 8 kb/sec with 8 bits per sample and with each 8-bit sample transmitted as a byte. This is illustrated in FIG. 9, where the TSI input stream from the public switched telephone network is shown to contain N' multiplexed communications channels $CH_1$ to $CH_{N'}$, where N' is greater than or equal to the number N of angular sectors $S_1$ to $S_N$ of wireless system 10. (When N' exceeds N, there will be more than one time-division multiplexed output stream from TSI 52, as will be explained below). Each channel contains a corresponding bit sequence comprised of eight bits as b1,1 to b1,8 where each bit occupies a time slot of a duration $t_{ss}$. Thus, an entire frame transmission occupies a time duration of $8N't_{ss}$. (Framing and control bits are required but are omitted from FIG. 9 for pedagogical reasons. The addition of these bits results in a longer frame time).

TSI 52 advantageously includes a buffer memory for temporarily storing the input data stream and then retrieving it for outputting in a different order as controlled by control processor 54. When a public switched telephone network user initiates a call intended for one of the wireless terminals $T_1$ to $T_N$ of FIG. 1, one of the time-division multiplexed channels on the public switched telephone network side is allocated to the call by the public switched telephone network central office. The signaling information transmitted at call initiation containing coded call destination data, can arrive at TSI 52 either within the same time-division multiplexed data stream containing the audio samples, or in another time-division multiplexed data stream transmitted over a different frequency band but in time synchronism with the audio data stream. In either case, TSI 52 relays the call destination data to control processor 54 which compares it to corresponding connection codes in connection memory 56. These connection codes correspond to the telephone numbers of wireless terminals $T_1$ to $T_N$. Also stored in connection memory 56 are codes containing the angular sector and, optionally, the frequency channel corresponding to each wireless terminal $T_1$ to $T_N$. (Frequency channel information can be stored if more than one frequency channel is utilized in the wireless system. The frequency channel used for each wireless terminal $T_1$ to $T_N$ can be fixed or can be determined dynamically by the system to optimize communication quality). Once control processor 54 retrieves these codes, it enables the data stored in the TSI 52 memory buffer to be read out in an order determined by the angular sector code retrieved. The bit rate at which the data is read out is determined by synchronization pulses supplied on line 51 from scan control assembly 512. A timing circuit within assembly 512 generates these synchronization pulses for synchronization purposes. The data is outputted to transmitter assembly 506 on output line 63 and on optional output lines 67, if needed. In the reverse direction, TSI 52 receives time-division multiplexed data from receiver assembly 504 on input line 70, and on optional input lines 71, if needed.

It should be noted that for systems that require a large amount of memory storage for the incoming and outgoing communications data, a Time-Space-Time (TST) network could be employed, using two or more TSIs and a Time-Multiplexed-Switch (TMS), time-shared space-division switch, or a folded TSI-TMS combination, all of which are well-known in the art.

Also illustrated in FIG. 9 is an exemplary timing diagram for the reordered output data stream of TSI 52 for a single wireless frequency channel. Each data bit of the TSI output stream occupies a time interval $t_s$, which is 43.4 ns in the illustrative case, so that a full rotation takes a time of $Nt_s$ or 15.625 us. Time intervals $t_s$ can be different from time intervals $t_{ss}$. Advantageously, the time interval of $8Nt_s$ equals the time interval of $8N't_{ss}$, so that during one public switched telephone network frame, one 8-bit sample is transmitted to each corresponding one of the N wireless terminals in use. As an example of the data reorganization performed by TSI 52, it is assumed that the audio data bits of time-division multiplexed channels $CH_8$, $CH_1$ and $CH_2$ are intended for wireless terminals $T_1$, $T_2$ and $T_3$, respectively. Accordingly, the first bit $b_{8,1}$ of channel $CH_8$ is transmitted during the interval time t=0 to $t_s$, followed by the first bit $b_{1,1}$ of channel $CH_1$ and the first bit $b_{2,1}$ of channel $CH_2$. After the first bit of each of the N channels corresponding to the N wireless terminals is outputted, the second bits $b_{8,2}$, $b_{1,2}$ and $b_{2,2}$ of the corresponding channels are transmitted. The process repeats until all 8 bits of each channel are outputted at the time $t=8Nt_s$, which corresponds to eight 360° rotations of the antenna beam.

Figure 10:
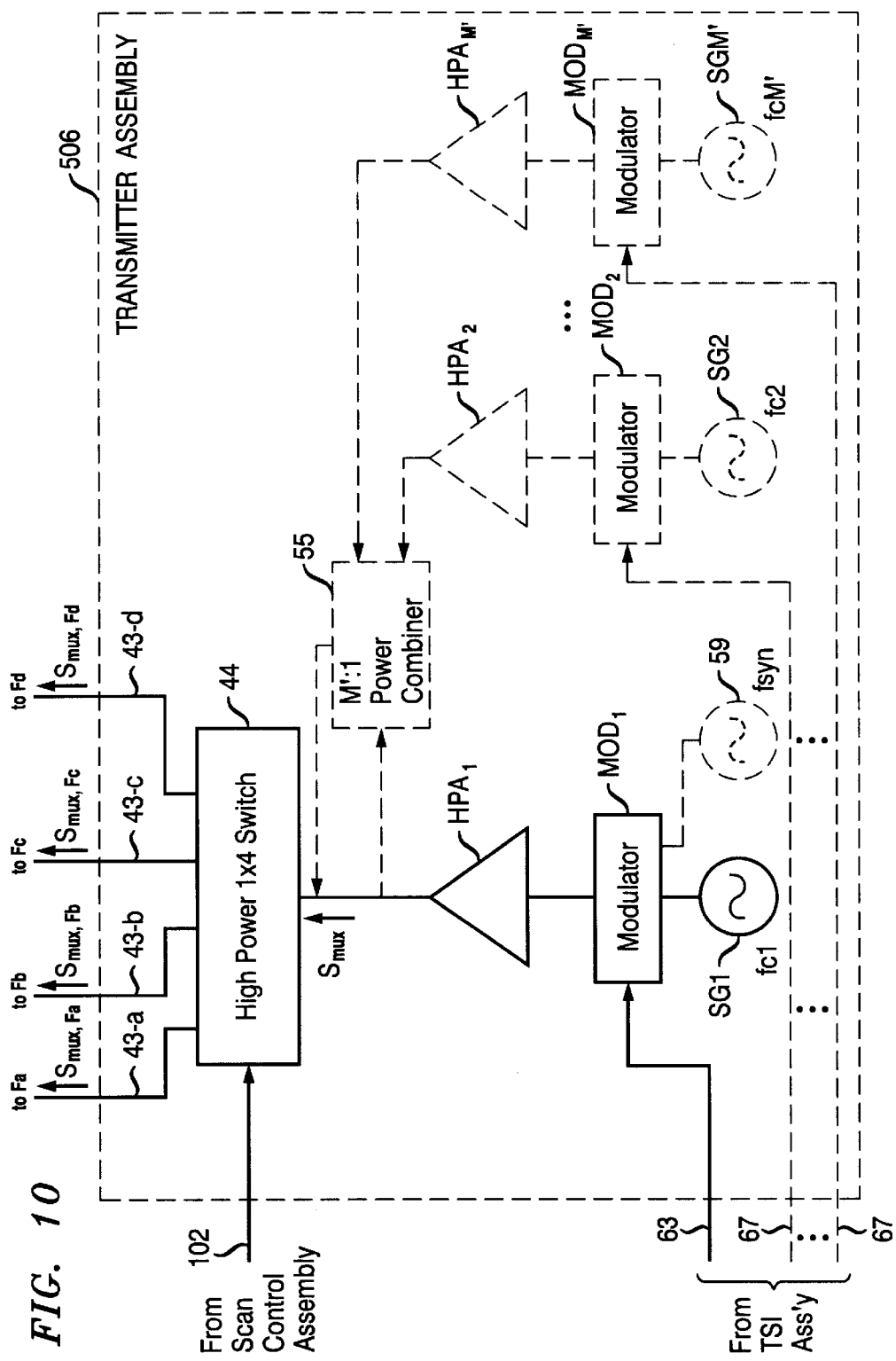
FIG. 10 is a schematic block diagram of a transmitter assembly, which can be used within the system of FIG. 5.

FIG. 10 shows a schematic block diagram of an exemplary base station transmitter assembly 506. Transmitter assembly 506 provides time-division multiplexed signals $S_{MUX,Fa}$–$S_{MUX,Fd}$, which carry communication information to aperture faces $F_a$ to $F_d$, respectively, on lines 43-*a* to 43-*d*, respectively. Each signal $S_{MUX,Fa}$ to $S_{MUX,Fd}$ is applied for 25% of the time, in the current example. Switching between aperture faces is accomplished by fast-switching high power switch 44, which can employ PIN diode switches with switching times on the order of a few nanoseconds.

For the case of a single wireless terminal per angular sector, the entire TSI 52 output data stream is applied to modulator $MOD_1$ via output line 63. Modulator $MOD_1$ modulates a carrier frequency $fc_1$ in accordance with the TSI data, where $fc_1$ is generated by signal generator $SG_1$. When there is no communication message intended for a given wireless terminal, the outputted TSI data stream can contain empty time slots to indicate this condition. Depending on the modulation scheme used, there need not be any RF transmission to that wireless terminal. To prevent this, another signal generator 59 can be employed to provide a synchronization signal at a frequency $f_{syn}$ to modulator $MOD_1$. In this case, modulator $MOD_1$ is designed to transmit a tone at the frequency $f_{syn}$, which is superimposed with the time-division multiplexed data stream during each time slot of the data stream. This will ensure that wireless terminals $T_1$ to $T_N$ always receives a synchronization signal at frequency $f_{syn}$. In addition, the transmission of a synchronization signal enables the receiver in a wireless terminal to shut down when the main lobe of beam B is not on wireless terminal. This can significantly improve the signal to noise (S/N) ratio at the wireless terminals and base station 19.

When there are multiple wireless terminals in one or more angular sectors, the number of communication channels N' in the public switched telephone network data stream can be greater than the number N of angular sectors. In this case, additional time-division multiplexed output streams can be provided by TSI 52 on output lines 67. A separate modulator can then be employed to modulate each time-division multiplexed output data stream. Hence, for M' output data streams, M' modulators MOD, to $MOD_{M'}$ are utilized, each modulating an associated carrier frequency $fc_1$ to $fc_{M'}$ generated by signal generators $SG_1$ to $SG_{M'}$, respectively. Carriers $fc_1$ to $fc_{M'}$ are preferably closely spaced in frequency and can be 25 KHz apart. After each modulated output is amplified by an associated amplifier $HPA_1$ to $HPA_{M'}$, the amplified outputs are combined in M':1 combiner 55 to produce a composite signal $S_{MUX}$, which is applied to the input of switch 44. Therefore, in the multi-carrier case, signal $S_{MUX}$ is both a time-division multiplexed and a frequency-division multiplexed signal, whereas in the single carrier case it is just a time-division multiplexed signal. In either case, it will be understood that spread spectrum techniques can be employed instead of, or in addition to, the time-division multiplexed and frequency-division multiplexed approaches.

Figure 11:
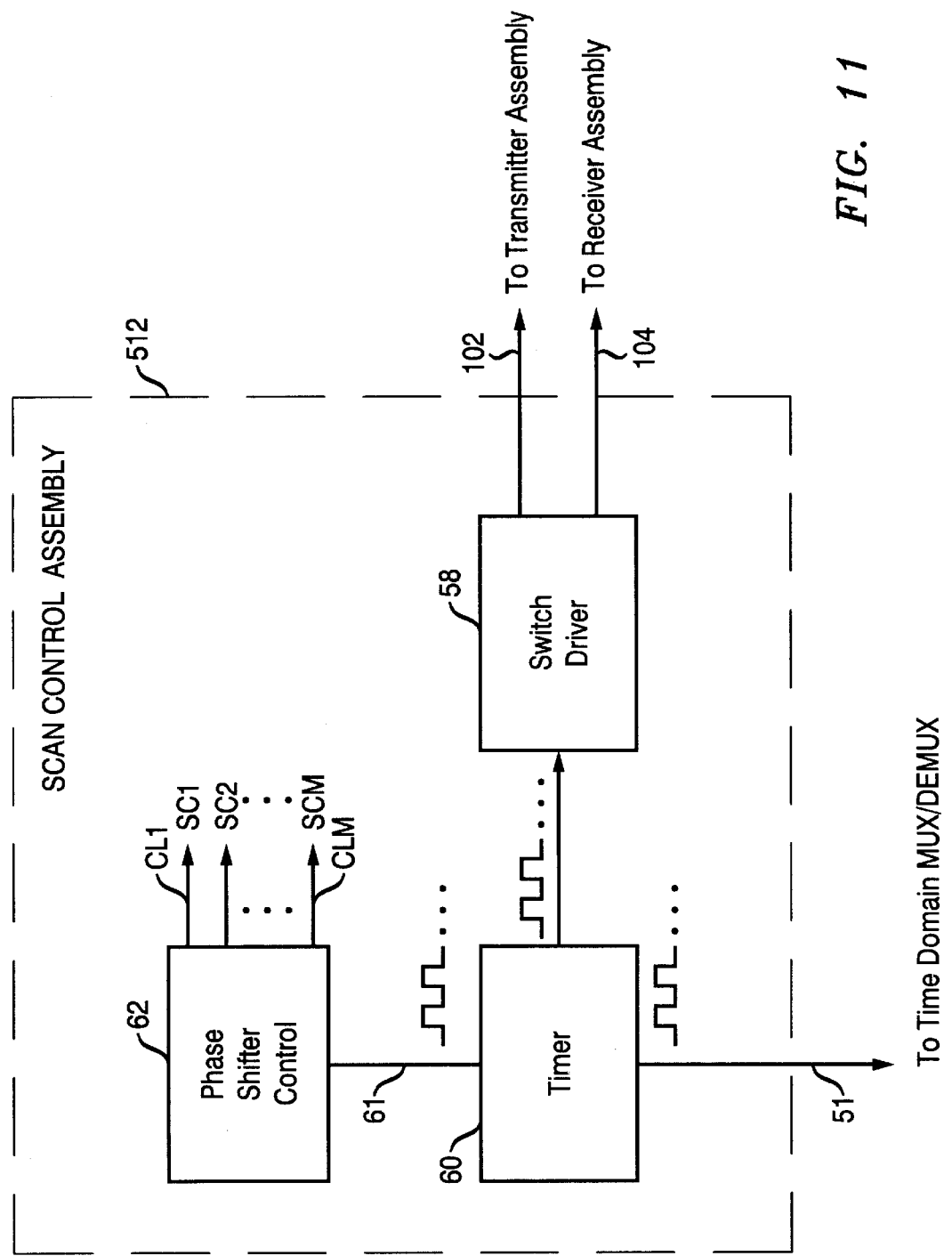
FIG. 11 is a schematic block diagram of a scan control assembly usable within the system of FIG. 5.

FIG. 11 depicts a schematic block diagram of an exemplary scan control assembly 512. Timer 60 generates synchronized synchronization pulses to synchronize the scanning of the beam B with the transmission of the modulated data. Phase shifter control 62 receives synchronized synchronization pulses on line 61 and, in turn, generates respective phase shifter control signals $SC_1$ to $SC_M$ on control lines $CL_1$ to $CL_M$ to scan the antenna beam. Synchronized synchronization pulses are also provided to switch driver circuit 58, which, in turn, successively switches the output path of high power switch 44 between aperture faces $F_a$ to $F_d$ every quarter rotation of beam B.

Figure 12:
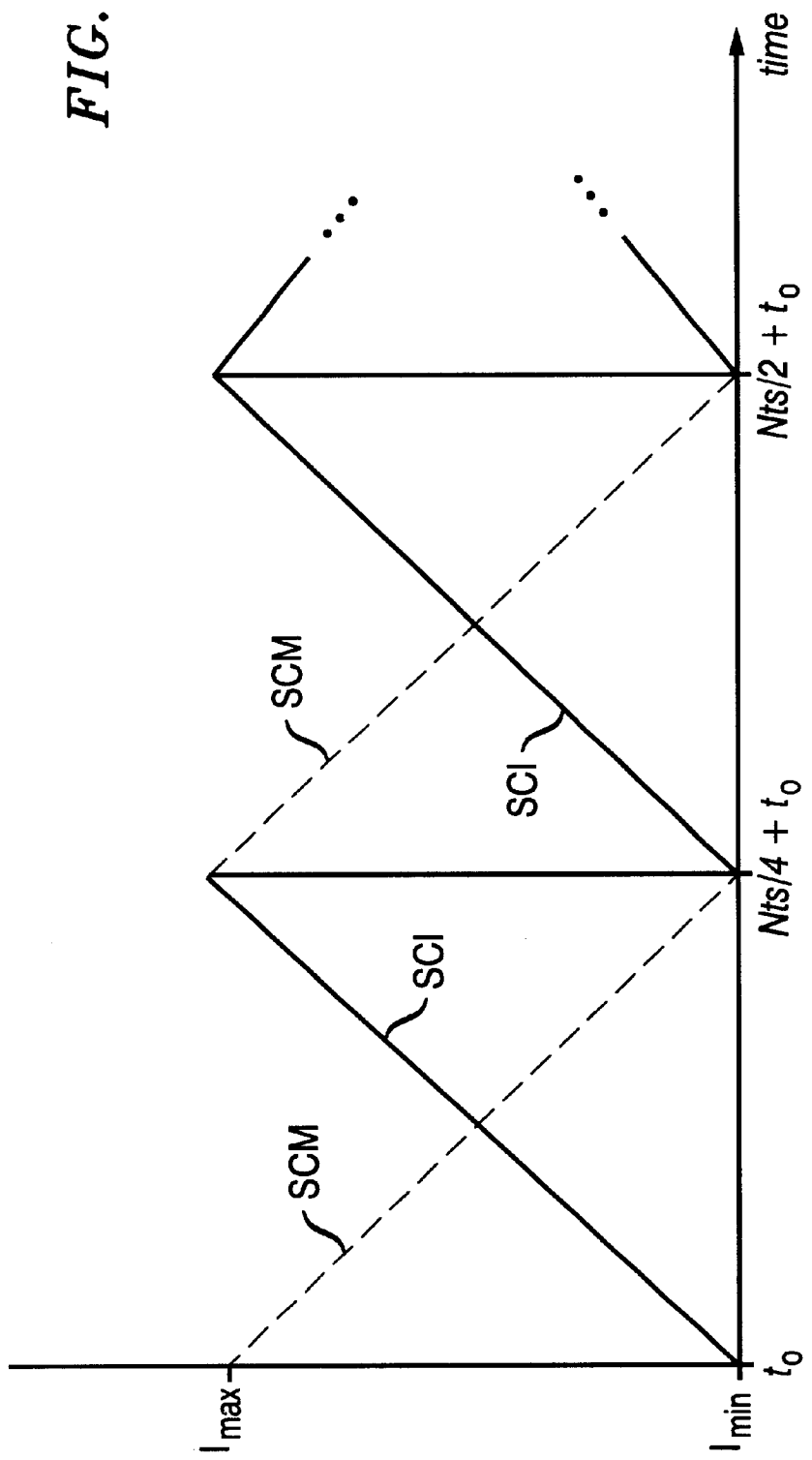
FIG. 12 shows current waveforms used to control phase shifters within the antenna of FIG. 6.

As illustrated in FIG. 12, phase shifter control signals $SC_1$ to $SC_M$ are time-varying current waveforms that repeat every quarter rotation (i.e., $Nt_s/4$ seconds). At the beginning of a rotation at time $t=t_0$, signals $SC_1$ and $SC_M$ are at respective minimum and maximum current levels $1_{min}$ and $1_{max}$ to produce respective minimum and maximum phase shifts in associated phase shifters $PS_1$ and $PS_M$ of aperture face $F_a$ to $F_d$ that is transmitting. At this time, signals $SC_2$ to $SC_{M-1}$ are at progressively higher current levels in between $1_{min}$ and $1_{max}$ to produce a scanned beam at one extreme scan angle of the radiating aperture face $F_a$ to $F_d$. At the end of a quarter rotation (i.e., at $t=(t_0+Nt_s/4)$), signals $SC_1$ and $SC_M$ are at respective current levels $1_{min}$ and $1_{max}$ and signals $SC_2$ to $SC_{M-1}$ are at progressively lower current levels in between $1_{min}$ and $1_{max}$ to produce a scanned beam at the other extreme scan angle for the radiating face. Accordingly, each of the scanning signals $SC_1$ to $SC_M$ has a different slope during each quarter rotation.

The scanning signals $SC_1$ to $SC_M$ can be switched between their associated phase shifters $PS_1$ to $PS_M$ of the four aperture faces $F_a$ to $F_d$ in several ways. One approach is to utilize a 1 by 4 splitter (not shown) to divide each control line $CL_i$ from phase shifter control circuit 62 into four paths. Each of the four paths would then be connected to the corresponding one of the phase shifters of each aperture face, such as phase shifter $PS_1$ of each aperture face. With this approach, the phase shifters continually receive control signals, even when the associated aperture face is not transceiving. An alternative approach is to connect a 1 by 4 switch (not shown) to each control line $CL_i$, with each of the four outputs of the switch connected to the corresponding phase shifter of one of the aperture faces $F_a$ to $F_d$. Phase shifter control signals $SC_1$ to $SC_M$ would then be switched between the phase shifters of the four aperture faces at the same time that high power switch 44 switches between the faces.

In an alternative embodiment, wireless telecommunications system 10 is modified so that two opposing aperture faces (e.g., $F_a$ and $F_c$, $F_b$ and $F_d$) transceive, respectively, during one scanning interval, followed by the same on the other aperture faces. In yet another embodiment, each of the four faces transceives simultaneously. This is advantageous in that it eliminates the need for switching between the four aperture faces. The potential disadvantages of these two approaches is that they can degrade the S/N ratio of the system.

Figure 13:
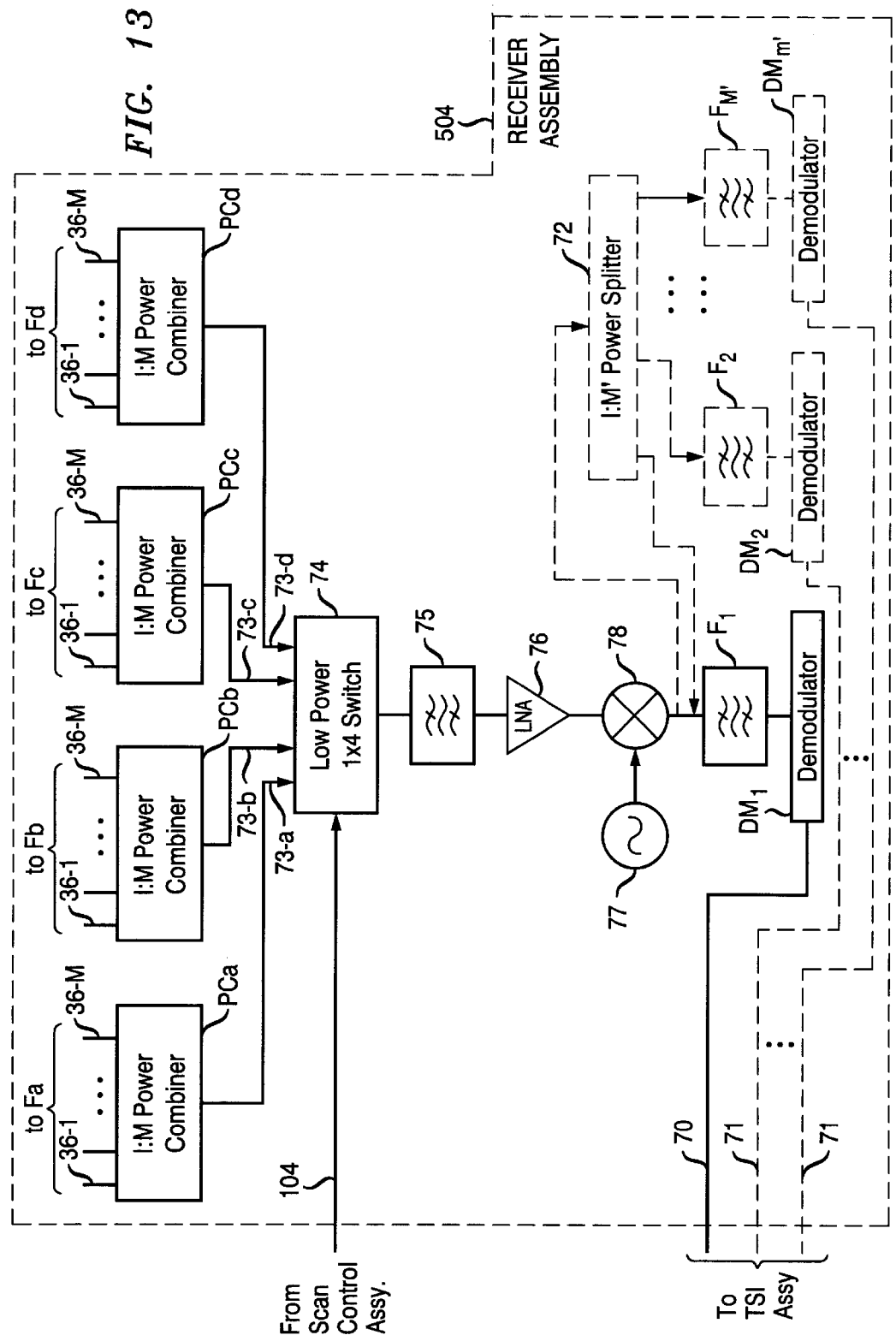
FIG. 13 is a schematic block diagram of a base station receiver assembly usable within the system of FIG. 5.

FIG. 13 shows a block diagram of illustrative base station receiving assembly 504, which receives the modulated data from wireless terminals $T_1$ to $T_N$, and forwards the data to its destination in the proper format for the public switched telephone network. During time slot $t_s$, data is received from one or more wireless terminals within the angular sector that corresponds to that time slot. The received signals appear at each of the M receive ports R of duplexers 38-1 to 38-M (as shown in FIG. 7) that are associated with the respective aperture face. The signals on receive ports R are routed via transmission lines 36-1 to 36-M to one of four 1:M power combiners $PC_a$ to $PC_d$. Each power combiner combines the signals it receives and outputs the power, via lines 73-*a* to 73-*d*, to one of four input ports of low power switch 74. At any given time, switch 74 and high power switch 44 are directed to the same aperture face. Switch 74 is controlled by a control signal on control line 104, which originates from switch driver 58 of scan control assembly 512.

The output of switch 74 is filtered by bandpass filter 75, which typically has a passband that corresponds to a frequency band that encompasses all of the used frequency channels. The filtered output is amplified by low noise amplifier 76 and down-converted to an intermediate frequency (IF) signal by mixer 78 and local oscillator 77. In a single channel system, this IF signal is filtered by narrow bandpass filter $F_1$ and demodulated by demodulator $DM_1$. Demodulator $DM_1$ then supplies a demodulated data stream to TSI 52 (FIG. 8) via input line 70. In a multi-carrier system with M' carriers, the IF output of mixer 78 is applied to M':1 power divider 72 where it is split up among M' outputs. Each of the M' outputs is applied to one of M' narrow bandpass filters $F_1$ to $F_{M'}$, each having a passband that corresponds to one of the down-converted channels. The filtered outputs are then demodulated by respective demodulators $DM_1$ to $DM_{M'}$, and, thereafter, each demodulated time-division multiplexed data stream is applied to TSI 52 via a separate one of input lines 71 and 70. TSI 52 then reorders the data streams for re-transmission to the public switched telephone network in the reverse manner than that which was performed on incoming signals. Therefore, the individual data bits from the wireless terminals are assembled into 8-bit sequences and transmitted over the public switched telephone network.

When a call is initiated at a wireless terminal, control processor 54 (FIG. 8) searches for an idle channel in the time-division multiplexed data stream which can accommodate the call. When a channel is found, the signaling data from the wireless terminal is first transmitted over that channel. Thereafter, if a connection is established to a user via the public switched telephone network, the audio, video, data or other multimedia signal is transmitted.

Figure 14:
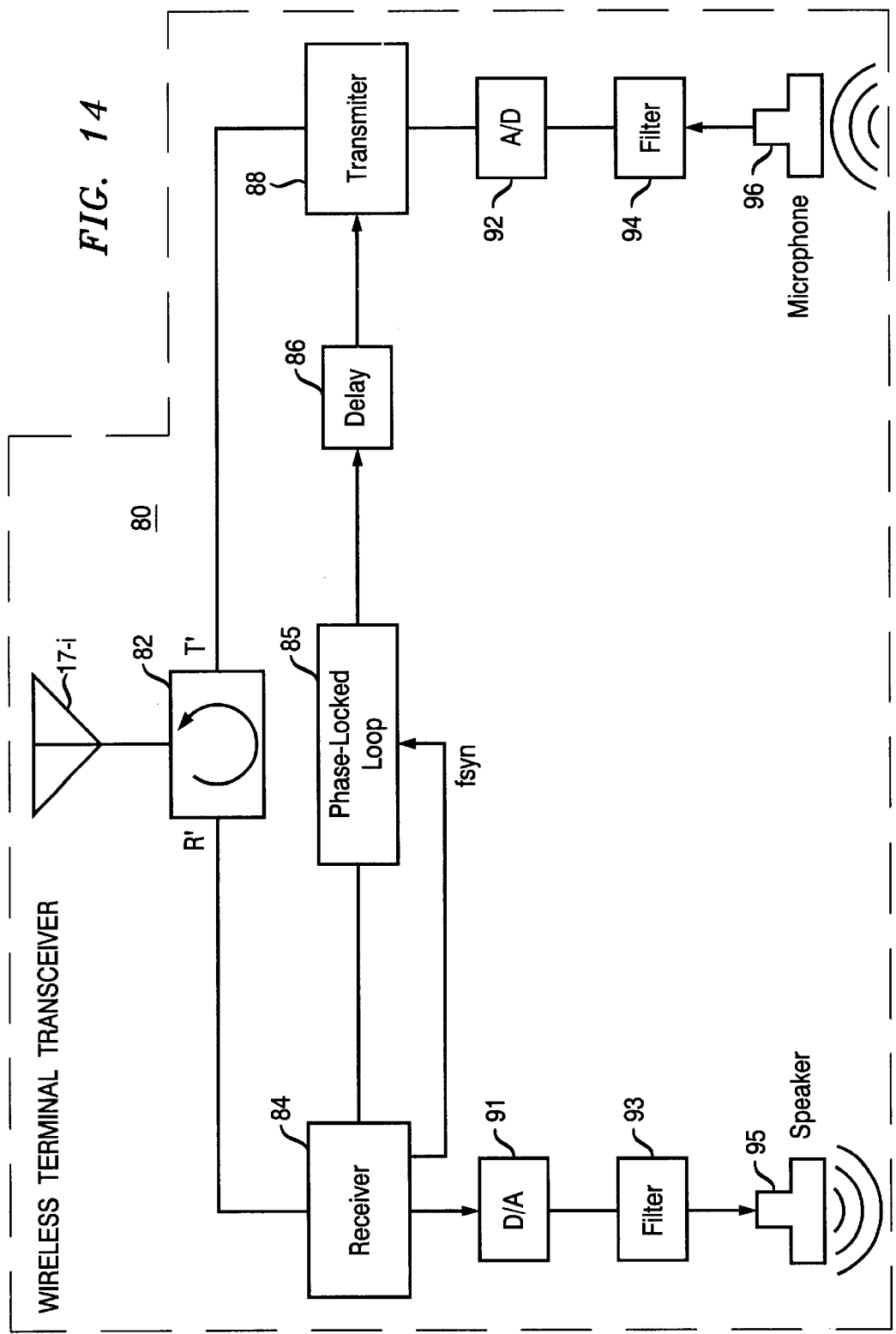
FIG. 14 shows a transceiver system which can be used at the wireless terminals of FIG. 5.

FIG. 14 shows a schematic block diagram of an illustrative wireless terminal, generally designated as 80, which can be used with embodiments of the present invention. Wireless terminal 80 advantageously performs all of the functionality of a conventional wireless terminal plus those that enable it to transmit and/or receive in synchronism with the rotation of beam B.

Modulated RF communication messages originating from base station 19 are received by antenna 17-$i$ and appear at receive port R' of duplexer 82. Receiver 84 then operates to amplify, down-convert, filter and demodulate the received signal in a conventional manner. Digital-to-analog converter 91, filter 93 and speaker 95 convert the output of receiver 84 into sound, in well-known fashion. If the communication messages represent non-audible information (e.g., a facsimile or visual image), then a different, more suitable device (not shown) would receive the output of receiver 84.

For transmission, a microphone 96, filter 94 and analog-to-digital converter 92 transduce and digitize the user's voice, in well-known fashion. When wireless terminal 80 is designed to transmit data other that sound, another input device (not shown) would be used to provide data to transmitter 88. Transmitter 88 modulates the received data for transmission to base station 19, via duplexer 82 and antenna 17-$i$. In the illustrative embodiment, each wireless terminal transmits in time-division multiple access fashion (e.g., only when beam B is sweeping through that wireless terminal). The interval during which wireless terminal transmits is controlled by phased-locked loop 85, receiver 84, and delay circuit 86.

In one embodiment, synchronous reception and transmission of communication messages with the scanned antenna beam is enabled by the reception of the signal $f_{syn}$ which is transmitted by base station 19, as discussed above. Signal $f_{syn}$ is received by receiver 84 each time beam B sweeps through a wireless terminal, regardless of whether communication messages are being transmitted to that terminal during that rotation. Signal $f_{syn}$ is supplied to phased-locked loop 85 by receiver 84 periodically or sporadically to maintain synchronization. Thus, phased-locked loop 85 thus functions as an electronic metronome that is synchronized with the rate of rotation of beam B.

Phased-locked loops 85 also provides synchronization pulses to delay circuit 86, which delays the synchronization pulses for a duration that is a function of the distance between wireless terminal 80 and base station 19 and of the position of wireless terminal 80 within its angular sector. Delay 86 provides the delayed synchronization pulses to transmitter 88 to enable transmitter 88 to transmit during the appropriate intervals.

It will be understood that the interval of the time slots of data transmission and reception by the individual wireless terminals need not be the same as those of base station 19. For example, at a 64,000 rotations per second rotation rate and a 1° beamwidth, the time-division multiplexed time slots transmitted by base station 19 antenna will typically be 43.4 ns long, as discussed above. In this case, the maximum SIN ratio and minimum average power transmission at the wireless terminals will occur when the wireless terminal reception and transmission intervals are less than or equal to 43.4 ns. To mitigate against information loss, however, slightly larger time intervals can be used. At one extreme, receiver 84 is continuously on. Analogously, transmitter 88 could transmit continuously. One advantage of these extremes is that wireless terminal 80 would not need the phased-locked loop 85 or delay 86.

Figure 15:
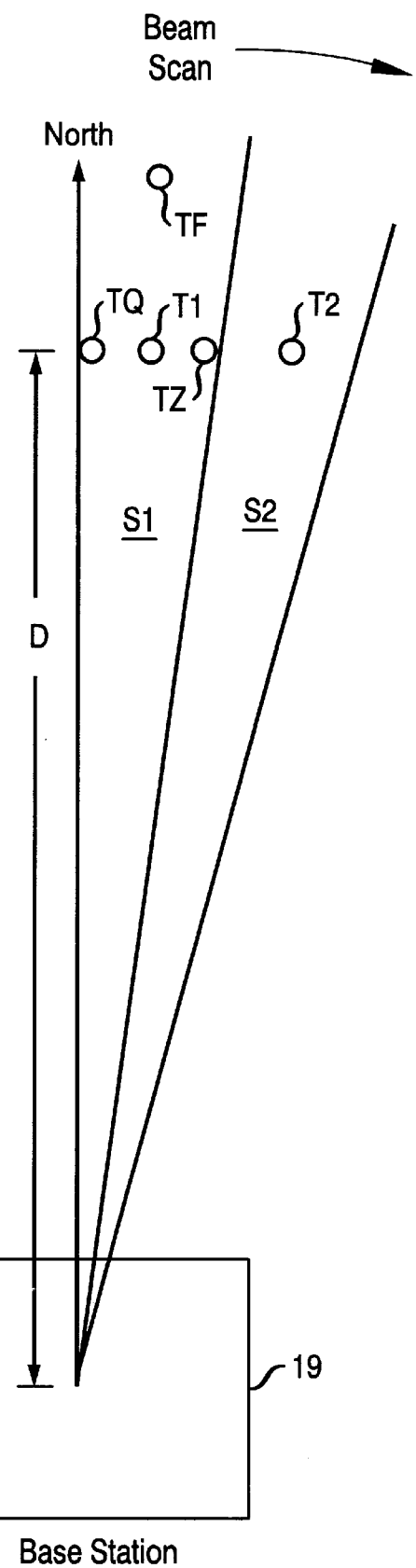
FIG. 15 illustrates an aerial view of another embodiment of the present invention.

The azimuthal position of a wireless terminal within its associated angular sector, as measured from base station 19, is another factor that affects the timing of transmission and reception by the wireless terminal. As shown in FIG. 15, wireless terminals $T_1$ and $T_F$ are in the center of sector $S_1$ and wireless terminals $T_Q$ and $T_z$ are on the edges of sector $S_1$. In accordance with an embodiment of the present invention, each of the four terminals can transceive in such a way so as to be distinguishable from one another. Wireless terminals $T_1$, $T_Q$ and $T_z$ are at the same distance D from base station 19, so that their respective delay circuits would impose the same delay but for their different azimuthal positions. Wireless terminal $T_F$ is shown further away than the other three, which means that its delay circuit must impose a different time delay to compensate for its greater distance from base station 19.

Figure 16:
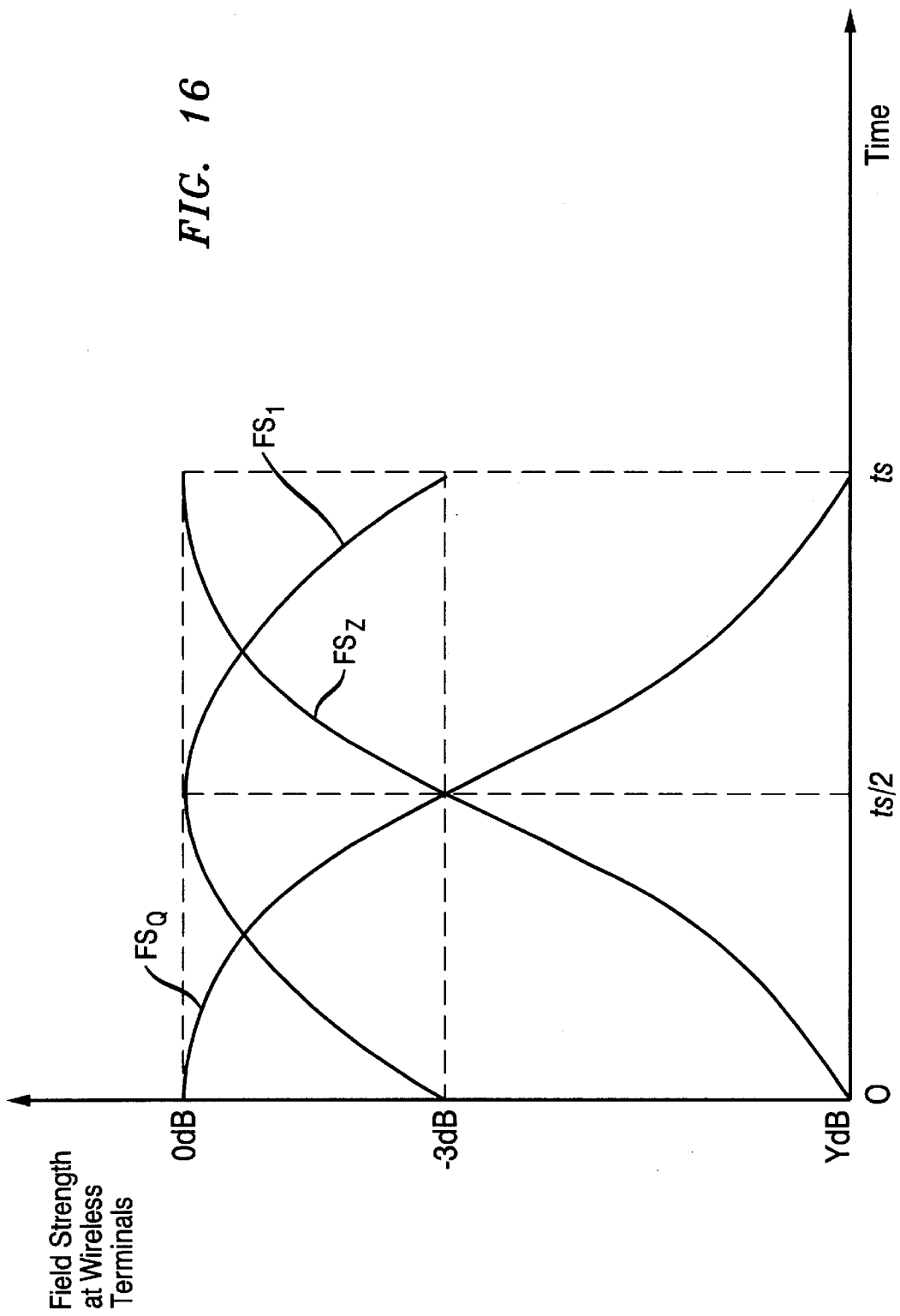
FIG. 16 shows plots of field strength of a beam at wireless terminal locations of FIG. 15.

FIG. 16 is a plot of the respective field strengths of wireless terminals $T_1$, $T_Q$ and $T_z$ as a function of time. As beam B sweeps through each wireless terminal, the field strength at the wireless terminal changes as a function of time. The field strength $FS_Q$ tapers from 0 dB to −3 dB from the time t=0 to $t_s/2$, and then to −Ydb at the time $t_s$, where the Y is a function of the shape of the main lobe of beam B. An analogous effect is apparent for terminal $T_z$.

The transmission of a single data bit by base station 19 to wireless terminals $T_1$, $T_Q$ and $T_z$ begins at time t=0 and ends at time t=$t_s$, which causes wireless terminal T1 to receive more signal energy than either wireless terminal $T_Q$ or $T_z$. Transmission of the signal $f_{syn}$ also occurs during the time t=0 to $t_s$. Accordingly, to further improve synchronization, terminal $T_Q$ can transmit data $t_s/2$ seconds later than terminal $T_1$, and terminal $T_z$ can transmit $t_s/2$ seconds earlier than $T_1$. This enables the maximum power from each wireless terminal to be captured at base station 19, which enhances the overall S/N ratio. Thus, the delay circuit in each wireless terminal is preferably capable of developing an appropriate delay to compensate for its azimuthal position within a sector.

It will be understood that the embodiments described above are merely exemplary and that one skilled in the art can make many modifications and variations to the disclosed embodiments without departing from the spirit and scope of the invention. For instance, while the embodiments have been described in conjunction with one rate of rotation of beam B and one bit transmission rate, it will understood that other values can be chosen for these parameters. In other embodiments, base station 19 could communicate with different wireless terminals using frequency-hopping technology. In another variation, data compression techniques can be employed to reduce bandwidth needs. Yet another variation is to transceive more than one bit per rotation. Accordingly, all variations and modification to the disclose embodiments are intended to be included within the scope of the invention as defined by the appended claims.

What is claimed is:

1. A base station that is capable of communicating with a plurality of wireless terminals, said base station comprising;
   an electronic scanning antenna for continuously rotating a beam that carries communication messages between said base station and said wireless terminals;
   a transmitter operatively coupled to said electronic scanning antenna that is capable of transmitting said communication messages, via said electronic scanning antenna, to said wireless terminals in a time-division multiplexed data stream that is synchronized with the rotation of said beam; and
   a receiver operatively coupled to said electronic scanning antenna that is capable of receiving said communication messages, via said electronic scanning antenna, from said wireless terminals in a time-division multiple access data stream that is substantially synchronized with the rotation of said beam.

2. The base station of claim 1 wherein said antenna is a phased array antenna comprising linearly saturable magnetic delay elements.

3. The base station of claim 1 wherein said electronic scanning antenna is capable of rotating said beam at a rate of 64,000 rotations per second.

4. The base station of claim 1 wherein said transmitter is capable of transmitting a single data bit in said time-division multiplexed data stream when a main lobe of said beam rotates through an antenna of a wireless terminal.

5. The base station of claim 1 wherein said electronic scanning antenna comprises a phased array antenna.

6. The base station of claim 5 wherein said phased array antenna comprises four planar aperture faces, wherein each of said aperture faces scans a 90 degree azimuthal sector.

7. The base station of claim 1, wherein said beam is a fan-shaped beam having azimuthal and elevational beamwidths with the elevational beamwidth being broader than the azimuthal beamwidth.

8. The base station of claim 1 wherein:
   said transmitter transmits said communications messages in a time-division multiplexed and frequency-division multiplexed data stream that is synchronized with the rotation of said beam; and
   said receiver receives said communication messages in a time-division multiple access and frequency-division multiple access data stream that is synchronized with the rotation of said beam.

9. The wireless terminal of claim 1 wherein said electronic scanning antenna is capable of transmitting a synchronization signal in said time-division multiplexed data stream to enable a wireless terminal to transmit said communication messages to said base station in synchronism with said beam.

10. A method for a plurality of communication messages, said method comprising:
   continuously rotating, with an electronic scanning antenna, a beam;
   transmitting with said beam a plurality of said communication messages to a plurality of wireless terminals in a time-division multiplexed data stream that is synchronized with a rate of rotation of said beam; and
   receiving a plurality of said communication messages from said wireless terminals in a time-division multiple access data stream that is also synchronized with said rate of rotation of said beam.

* * * * *